United States Patent
Takechi et al.

(10) Patent No.: US 7,699,257 B2
(45) Date of Patent: Apr. 20, 2010

(54) DUAL BEARING REEL HANDLE SHAFT STRUCTURE

(75) Inventors: Kunio Takechi, Osaka (JP); Ken'ichi Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 79 days.

(21) Appl. No.: 11/968,409

(22) Filed: Jan. 2, 2008

(65) Prior Publication Data
US 2008/0173745 A1    Jul. 24, 2008

(30) Foreign Application Priority Data
Jan. 23, 2007    (JP) .............................. 2007-013089

(51) Int. Cl.
*A01K 89/00* (2006.01)
(52) U.S. Cl. ...................... 242/319; 242/321
(58) Field of Classification Search ................ 242/245, 242/321, 319, 257
See application file for complete search history.

(56) References Cited

U.S. PATENT DOCUMENTS

| | | | |
|---|---|---|---|
| 5,996,918 A * | 12/1999 | Nanbu | 242/267 |
| 6,189,822 B1 * | 2/2001 | Ikuta | 242/296 |
| 6,637,690 B2 * | 10/2003 | Matsuda | 242/231 |
| 6,712,301 B2 * | 3/2004 | Morise | 242/319 |
| 6,786,442 B2 * | 9/2004 | Sugawara | 242/231 |
| 2001/0038052 A1 * | 11/2001 | Oishi et al. | 242/255 |
| 2002/0023980 A1 * | 2/2002 | Matsuda et al. | 242/319 |
| 2002/0063181 A1 * | 5/2002 | Yamaguchi | 242/286 |
| 2002/0079395 A1 * | 6/2002 | Matsuda | 242/231 |
| 2002/0096587 A1 * | 7/2002 | Ikuta | 242/319 |
| 2003/0111569 A1 * | 6/2003 | Hitomi | 242/321 |

FOREIGN PATENT DOCUMENTS

| JP | 2001-58401 A | 3/2001 |
|---|---|---|
| JP | 2004-350650 A | 12/2004 |

* cited by examiner

*Primary Examiner*—Evan H Langdon
(74) *Attorney, Agent, or Firm*—Shinjyu Global IP

(57) ABSTRACT

A handle shaft support structure rotatably supports a handle shaft on a reel unit, and includes a boss portion, a roller type one-way clutch, and a pair of seal members. The boss portion is a cylindrical member that is detachably mounted to the reel unit. The one-way clutch includes an outer ring that is non-rotatably coupled to the inner peripheral surface of the boss portion, an inner ring that is arranged on the outer periphery of the handle shaft and is integrally rotatably coupled to the handle shaft, and rolling elements that are arranged between the outer and inner rings. The one-way clutch supports the handle shaft rotatably only in one direction. The pair of seal members are members that are arranged on the both sides of the one-way clutch to seal the one-way clutch.

15 Claims, 14 Drawing Sheets

DUAL BEARING REEL HANDLE SHAFT STRUCTURE

CROSS-REFERENCE TO RELATED APPLICATIONS

This application claims priority under 35 U.S.C. §119 to Japanese Patent Application No. 2007-013089, filed in Japan on Jan. 23, 2007, the entire contents of which are hereby incorporated herein by reference.

BACKGROUND OF THE INVENTION

1. Field of the Invention

The present invention relates to a dual bearing reel handle shaft support structure, and in particular to a dual bearing reel handle shaft support structure that rotatably supports a handle shaft on a reel unit of a dual bearing reel.

2. Background Information

Generally, a dual bearing reel has a handle shaft with a handle non-rotatably coupled thereto. In order to activate the drag mechanism of the dual bearing reel, this type of handle shaft is prohibited from rotating in the line reel-out direction by a one-way clutch. The type of one-way clutch employed is a roller type one-way clutch, which is capable of supporting the rotation of a the handle shaft and can prohibit the handle shaft from rotating in one direction (See, for example, Japanese Unexamined Patent Application Publication No. 2001-58401). In order to prevent the intrusion of foreign matter such as liquids into the interior of a reel through the one-way clutch, conventional one-way clutches are located in a boss portion that is formed to protrude from a side cover. A seal member is arranged on the outside in the axial direction of the one-way clutch. The one-way clutch is mounted to the boss portion by press-fitting or fitting. The seal member is mounted to the boss portion after the one-way clutch is mounted.

Also, among one-way clutches that are used for spinning reels, a one-way clutch is known in which a seal member is attached to the one-way clutch (See, for example, Japanese Unexamined Patent Application Publication 2004-350650). In a conventional one-way clutch, seal members are arranged on the both ends between the inner and outer rings of the one-way clutch.

In conventional one-way clutches, seal members are arranged outside of the one-way clutch. Here, the seal members are required to be mounted after the one-way clutch is mounted to the boss portion. This makes the task of installation of the seal members time consuming, and increases manufacturing costs.

In other known configurations, the seal members are required to be mounted in the one-way clutch, which also increases the cost of the one-way clutch.

SUMMARY OF THE INVENTION

An object of the present invention is to provide a structure that supports a handle shaft by way of a roller type one-way clutch. Another object of the present invention is to provide a structure that seals and prevents the intrusion of foreign substance into the one-way clutch. Still yet another objective of the present invention is to reduce manufacturing costs.

A dual bearing reel handle shaft support structure according to a first aspect of the present invention rotatably supports a handle shaft on a reel unit of a dual bearing reel, and includes a rotation supporting member, a roller type one-way clutch and a pair of seal members. The rotation supporting member is a cylindrical member that is detachably mounted to the reel unit. The roller type one-way clutch includes an outer ring that is non-rotatably coupled to an inner peripheral surface of the rotation supporting member, an inner ring that is coupled to the outer periphery of and integrally rotates with the handle shaft, and rolling elements that are arranged between the outer and inner rings. The roller type one-way clutch supports the handle shaft rotatably in only one direction. The pair of seal members are annular members that are arranged on both sides of the one-way clutch to seal the one-way clutch.

In this support structure, after the one-way clutch is mounted inside the rotation supporting member, the seal members are mounted on both sides of the one-way clutch. Then, the rotation supporting member with the one-way clutch and the seal members mounted thereto are is mounted to the reel unit. Accordingly, the seal members are easily mounted. Also, since it is not necessary to install the seal member in the one-way clutch, the cost of the one-way clutch is not increased. In this configuration, since the one-way clutch and the seal members are mounted to the rotation supporting member that is detachably mounted to the reel unit, the seal members can be easily installed and uninstalled. As a result, the cost of the one-way clutch can be suppressed. It is also possible to avoid increase of costs in protecting against the intrusion of foreign substance.

In a dual bearing reel handle shaft support structure according to a second aspect of the present invention, there is a structure according to the first aspect of the present invention, in which the inner ring has an axial length that allows the inner ring to protrude from the outer ring in the both axial directions, and the seal member seals the clearance between the inner peripheral surface of the rotation supporting portion and the outer peripheral surface of the inner ring to seal the one-way clutch. In this case, since the seal members are arranged between the inner ring and the rotation supporting member, it is possible to surely suppress the intrusion of foreign substance into the rolling element side.

In a dual bearing reel handle shaft support structure according to a third aspect of the present invention, there is a structure according to the first or second aspect of the present invention, in which the inner ring is coupled to and integrally rotates with the handle shaft through a drag washer that is coupled to and integrally rotates with the handle shaft. In this case, since it is not necessary to directly, and integrally rotatably couple the inner ring to the handle shaft, the coupling structure of the inner ring can be simplified.

In a dual bearing reel handle shaft support structure according to a fourth aspect of the present invention, there is a structure according to any of the first to third aspects of the present invention, in which the rotation supporting member includes a flange portion that is detachably mounted to the reel unit, and a cylindrical portion that extends axially outward from the flange portion and accommodates the one-way clutch on the inner peripheral surface of the cylindrical portion. In this case, since the flange portion with a diameter larger than the outer ring is used for fastening, the stress acting on the fastening part can be reduced. Accordingly, the number of fastening members such as screws can be reduced, for example. Also, since the rotation supporting member can be detachably mounted to the reel unit through the flange portion, it is possible to easily mount the rotation supporting member without the need for providing a special rotation-stopping structure.

In a dual bearing reel handle shaft support structure according to a fifth aspect of the present invention, there is a structure according to any of the second to third aspects of the present invention, in which the seal member includes a seal portion and a metal backup portion that reinforces the seal portion. The seal portion includes a cylindrical mount section that is mounted to the inner peripheral surface of the rotation supporting member, a disk section that extends from the mount section toward the inner ring, and a tapered lip section that is formed around the end of the disk section and is in contact with the inner ring. The lip section is inclined from the end of the disk section in a direction away from the one-way clutch. In this case, the tapered lip section can reduce the rotational resistance caused by friction between the lip section and the inner ring, and the backup section can improve the rigidity of the seal member. In addition to this, since the lip section extends outward, it is possible to efficiently suppress the intrusion of foreign substance from the external environment. Also, even in the case where the seal members are mounted from the both sides of the inner ring after the inner ring is mounted, since the lip section extends outward, the seal members can be smoothly mounted.

In the present invention, since the one-way clutch and the seal members are mounted to the rotation supporting member that is detachably mounted to the reel unit, the seal members can be easily installed and uninstalled, and the increase of cost of the one-way clutch can be suppressed. Therefore, it is possible to also suppress the increase of costs to prevent the intrusion of foreign substance.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
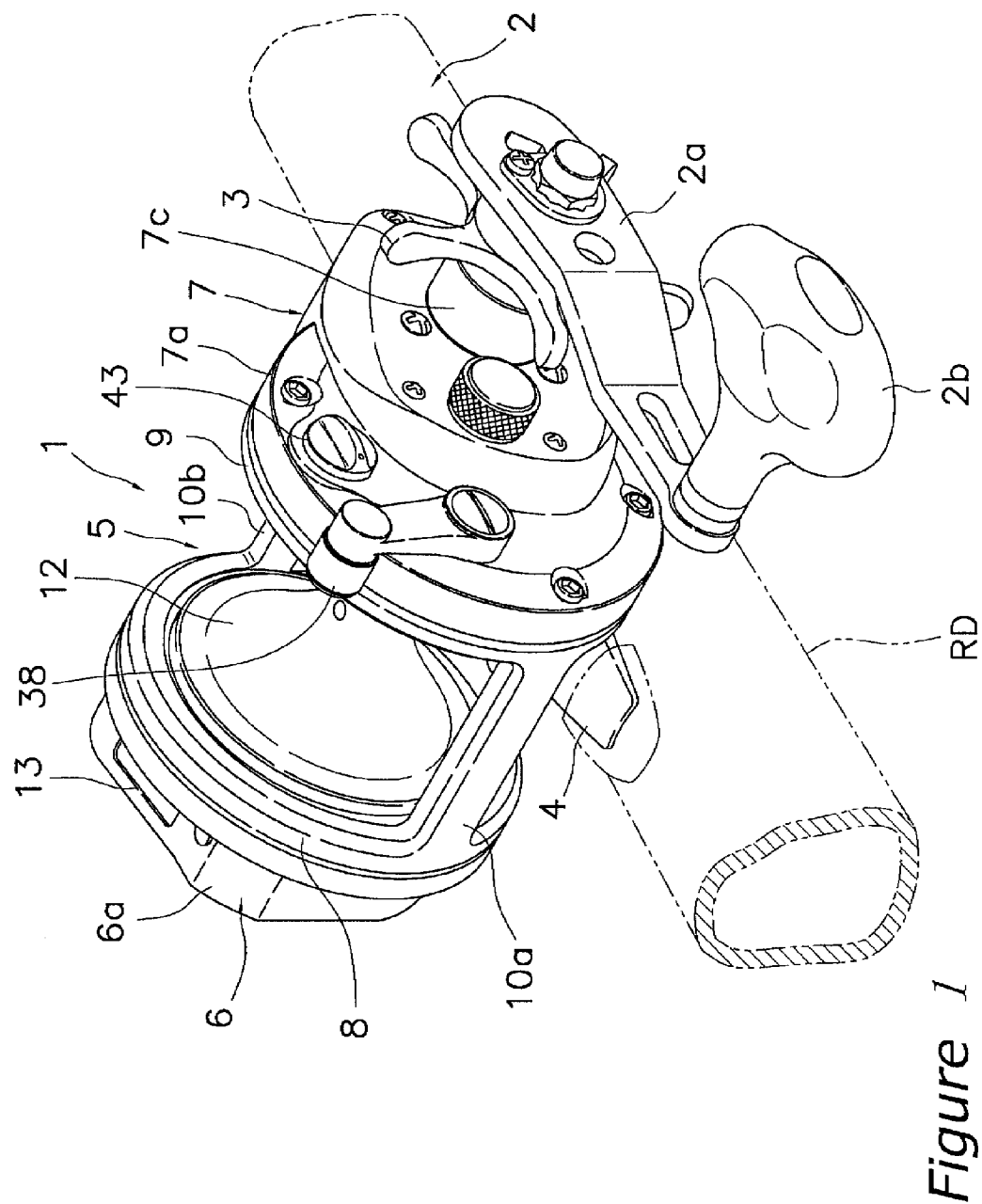
FIG. 1 is a perspective view of a dual bearing reel according to one embodiment of the present invention.
Figure 2:
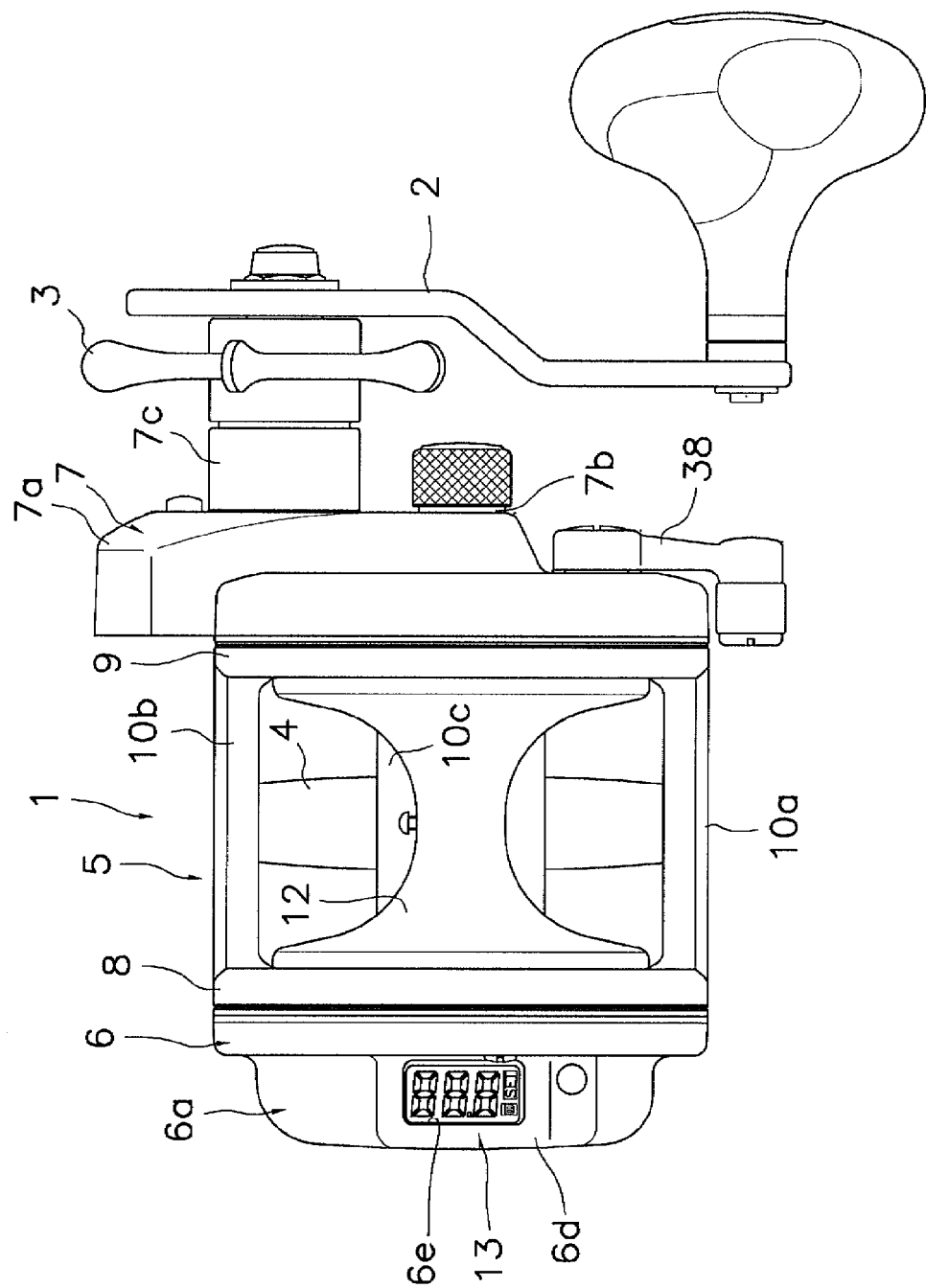
FIG. 2 is a plan view of the dual bearing reel.

With reference to FIGS. 1 and 2, a dual bearing reel according to an embodiment of the present invention can be mounted to a fishing rod, and pays out fishing line in the forward direction. For example, the dual bearing reel is a medium sized round type of reel that can wind fishing line of No. 18 about 150 m. The dual bearing reel includes a reel unit 1, a fishing line winding operation handle 2 that is disposed on the side of the reel unit 1, and a star drag 3 that is disposed on the handle 2 on the reel unit 1 side.

Note that the front/rear side and the left/right side in the following description are defined as the front side is a direction in that the fishing line is paid out in the state where the dual bearing reel is mounted to the fishing rod, and as the left/right side is defined when the dual bearing reel is viewed from the rear side.

Figure 3:
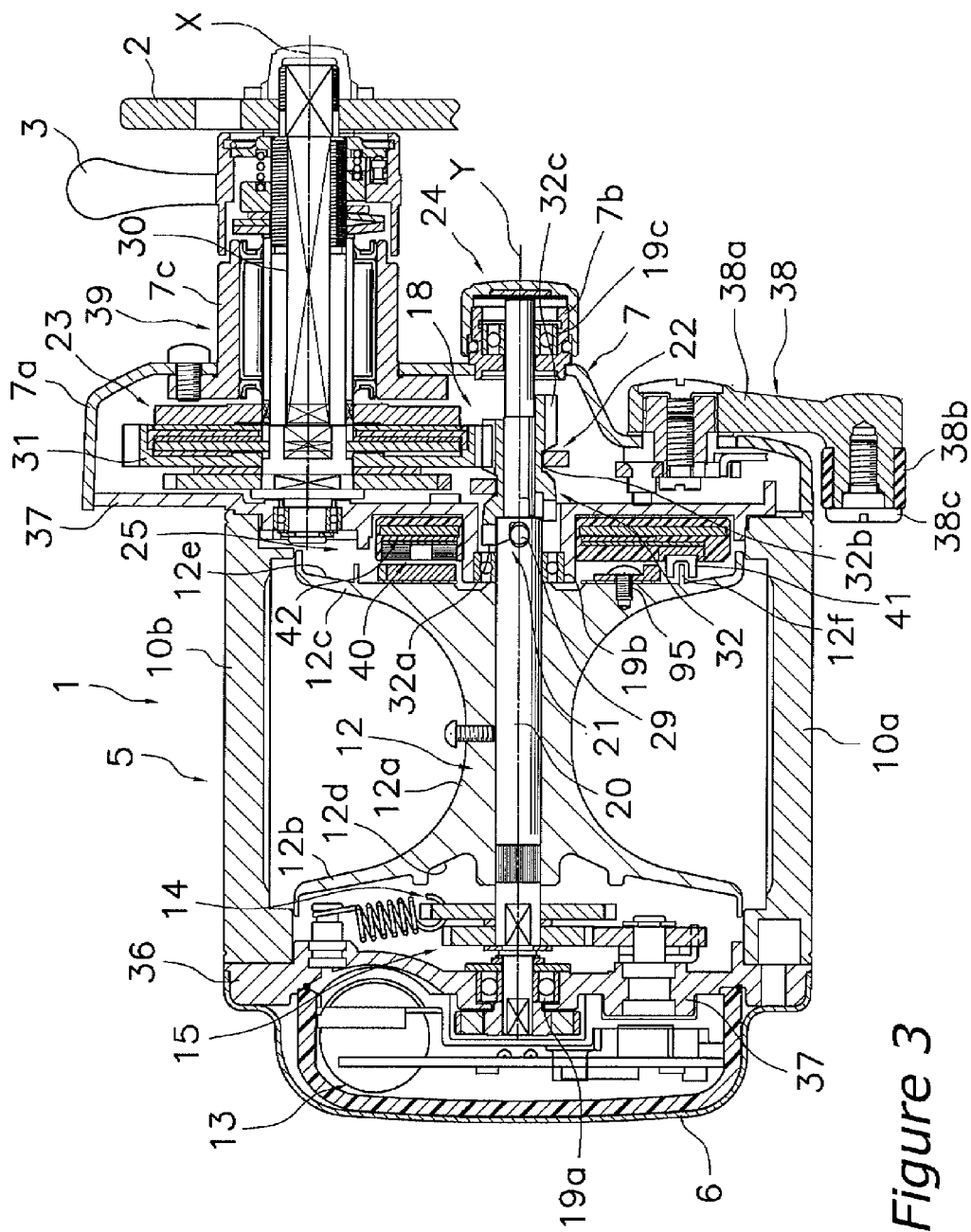
FIG. 3 is a plan cross-sectional view of the dual bearing reel.
Figure 4:
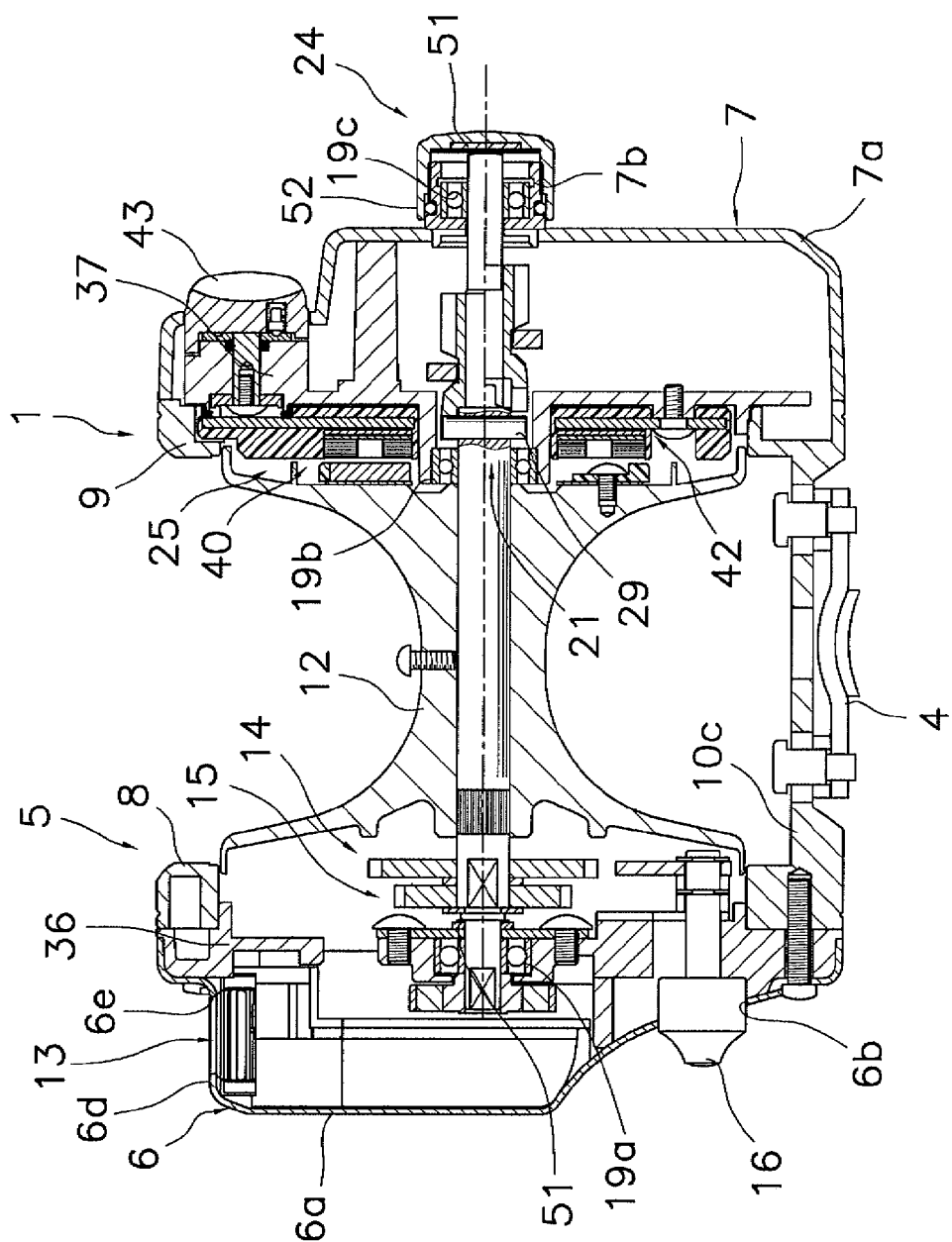
FIG. 4 is a back-side cross-sectional view of the dual bearing reel.
Figure 5:
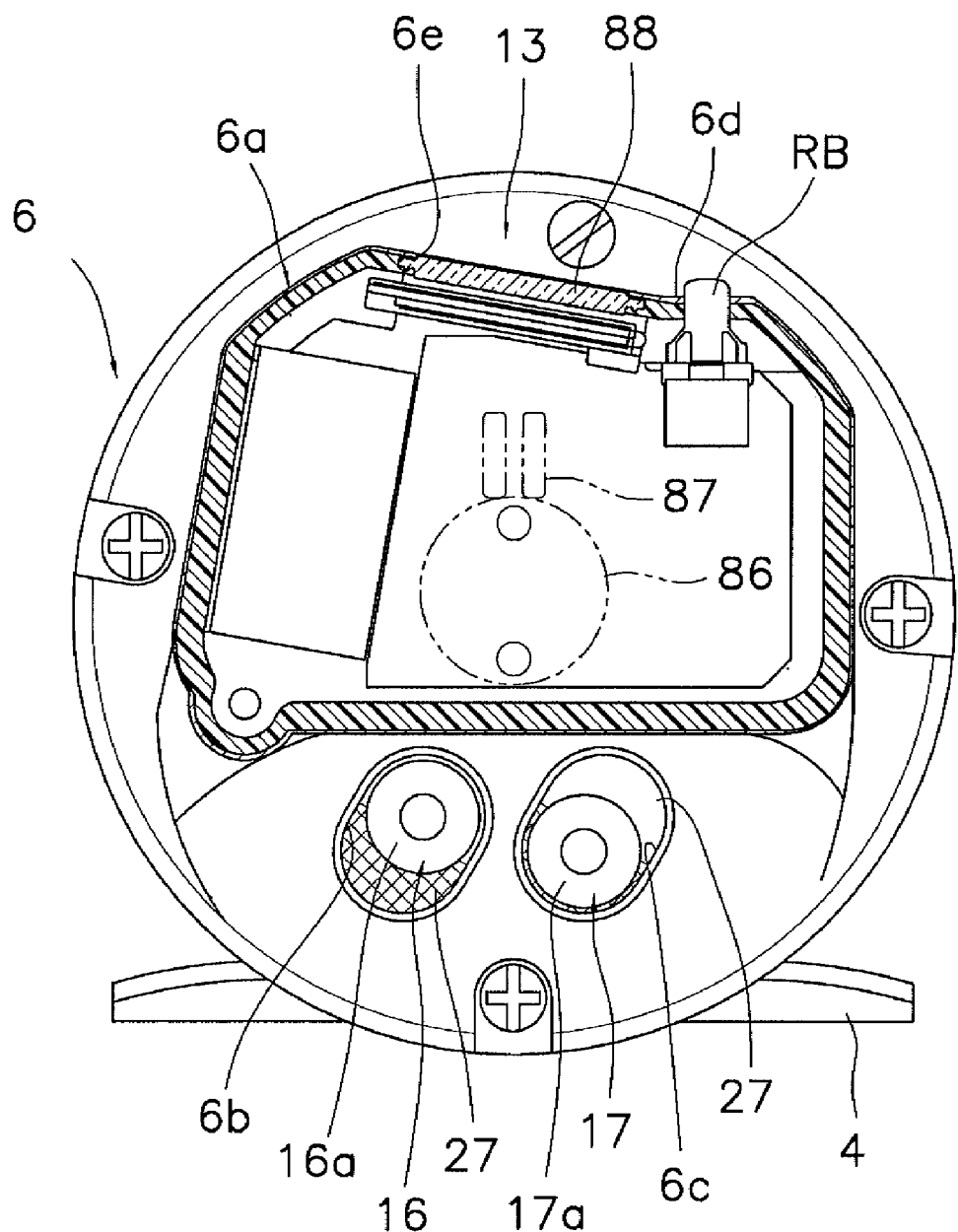
FIG. 5 is a partially cross-sectional right side view of the dual bearing reel.

Also, as shown in FIGS. 3 to 5, the dual bearing reel includes a line winding spool 12, a water depth indicator 13, a spool sounding mechanism 14, a spool locking mechanism 15, a sounding knob 16, and a locking knob 17. The line winding spool 12 is rotatably mounted to the reel unit 1. The water depth indicator 13 can electrically indicate the water depth of tackle that is attached to the end of the fishing line. The spool sounding mechanism 14 can generate sound in response to the rotation of the spool. The spool locking mechanism 15 can lock the rotation of the spool 12 in the line paying-out direction. For information, the dual bearing reel does not have a level wind mechanism.

The reel unit 1 is mounted on a fishing rod RD via a rod attachment leg 4. As shown in FIGS. 1 to 4 and 6 to 8, the reel unit 1 includes a frame 5 that is made of light-weight metal such as an aluminum alloy and a titanium alloy, and first and second side covers 6 and 7 that are made of light-weight metal such as an aluminum alloy and a titanium alloy and cover the both side of the frame 5. Note that, in the case where one of the frame 5, and the first or second side cover 6 or 7 is made of an aluminum alloy, and the other of the frame 5, and the first or second side cover 6 or 7 is made of a titanium alloy, a protection member that is made of a synthetic resin can be arranged between the frame 5, and the first or second side cover 6 or 7 in order to prevent galvanic corrosion. The frame 5 includes a pair of, left and right ring-shaped first and second side plates 8 and 9 that are spaced at a predetermined spacing away from each other, and a plurality of connectors 10a, 10b and 10c that connect the first and second side plates 8 and 9.

A first mechanism mount plate 36 is arranged between the first side cover 6 and the first side plate 8. The first mechanism mount plate 36 is fastened to the first side plate 8 by screws that pass through the first side cover 6 and are screwed into the first side plate 8. The spool sounding mechanism 14 and the spool locking mechanism 15 are arranged between the first mechanism mount plate 36 and the spool 12. Also, the water depth indicator 13 is accommodated between the first mechanism mount plate 36 and the first side cover 6.

A second mechanism mount plate 37 is arranged between the second side cover 7 and the second side plate 9. The second mechanism mount plate 37 is fastened to the second side plate 9 by screws that pass through the second side cover 7 and are screwed into the second side plate 9. Space for accommodating various types of mechanisms such as a gear mechanism 18 discussed later is formed between the second mechanism mount plate 37 and the second side cover 7.

The frame 5 is formed by die-casting. The second side cover 7 is formed by press-forming a thin metal plate. The first and second side plates 8 and 9, and the first side cover 6 have a round shape as viewed laterally. The outer peripheral surfaces of the first and second side plates 8 and 9, and the first side cover 6 are machined using, for example, a lathe or the like. The first mechanism mount plate 36 also has a round shape as viewed laterally. An outer peripheral part of the first mechanism mount plate 36 that is in contact with the first side plate 8 is exposed outward in a short axial length so that a level difference does not appear between the outer peripheral part of the first mechanism mount plate 36 and the first side cover 6. The other outer peripheral part and the side part of the first mechanism mount plate 36 are covered by the first side cover 6.

As shown in FIGS. 4 and 5, the first side cover 6 has a bulging portion 6a that is partially bulges laterally (axially outward) to accommodate the water depth indicator 13 therein. As shown in FIG. 5, the outlines of front and rear parts (the outlines of left and right parts in FIG. 5) of the bulging portion 6a have a substantially circular shape. As shown in FIG. 4, the cross-section of the bulging portion 6a in a direction in that the bulging portion 6a is close/apart to/from the rod attachment leg 4 protrudes perpendicular to the first side plate 8, and then is smoothly bent to be in parallel to the first side plate 8 so that the water depth indicator 13 is accommodated in the bulging portion 6a. After that, the cross-section of the bulging portion 6a is curved at the end of the accommodation part to be recessed toward the first side plate 8. As shown in FIG. 5, an indicating upper surface 6d of the bulging portion 6a (surface away from the rod attachment leg 4) is arranged at a position that is away from the rod attachment leg 4 relative to the center of the circular first side cover 6. The upper surface 6d has an exposing part that is in parallel to the rod attachment leg 4 and exposes a reset button RB that is arranged on the rear side. The upper surface 6d has an inclined part that is located frontward of the exposing part (leftward in FIG. 5) and is inclined slightly upward (in a direction away from the rod attachment leg 4) so that the front of the inclined part is higher. An opening 6e is formed in the inclined surface to expose the water depth indicator 13. Thus, an indicating surface of the water depth indicator 13 is inclined so that the front of the indicating surface is higher. Accordingly, an angler who operates the dual bearing reel behind the dual bearing reel can easily watch the water depth indicator 13.

Two oval openings 6b and 6c are formed in parallel to each other in the first side cover 6 under the bulging portion 6a to expose the sounding knob 16 and the locking knob 17, respectively. The opening 6b that accommodates the sounding knob 16 is formed to extend substantially along the diameter of the first side cover 6 so that the front of the opening 6b is lower.

Figure 6:
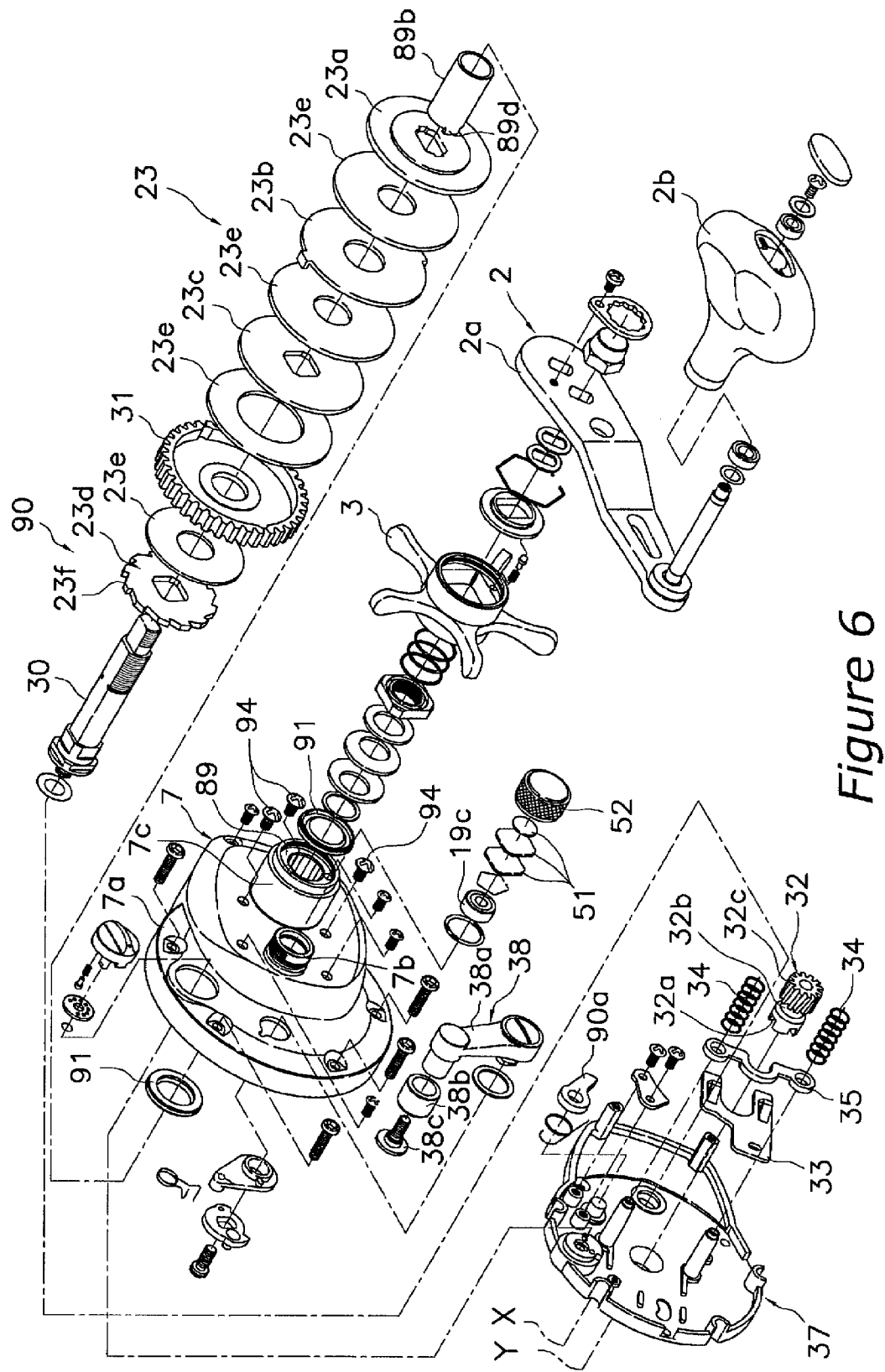
FIG. 6 is an exploded oblique view of the right-side part of the dual bearing reel.

The second side cover 7 and the second mechanism mount plate 37 have, as shown in FIG. 6, a shape in which a part of the circular shape projects radially outward as viewed laterally. The second side cover 7 includes a cover unit 7a, and first and the second boss portions 7b and 7c. The cover unit 7a is formed by press-forming a thin metal plate. The first and second boss portions 7b and 7c are mounted to the cover unit 7a. The cover unit 7a has a shape in which a part of the circular shape projects radially outward, and axially bulges from a mounting portion of a handle shaft 30 (discussed later). The first boss portion 7b is a cylindrical member, and supports a spool shaft 20 (discussed later). The first boss portion 7b is fastened to the cover unit 7a by crimp-fastening. The second boss portion 7c is a cylindrical member with a brim, and supports the handle shaft 30. The second boss portion 7c is fastened to the inner side surface of the cover unit 7a by a plurality of (e.g., three) screws 94 that are inserted from the outer side surface of the cover unit 7a.

As shown in FIGS. 3 and 4, a line winding spool 12 is rotatably mounted in the frame 5. Also, a clutch operation lever 38 is pivotably mounted to the rear side surface of the second side cover 7.

The clutch operation lever 38 is operated to turn the clutch mechanism 21 (discussed later) ON/OFF (connection/disconnection) so that the rotational force between the spool 12 and the handle 2 is connected/disconnected, as shown in FIGS. 3 and 6. The clutch operation lever 38 includes a metal lever 38a, and an elastic knob ring 38b. The base end of the metal lever 38a is pivotably supported by the second side cover 7. The metal lever 38a is made of aluminum, magnesium, or a stainless steel alloy, for example. The knob ring 38b is detachably attached to the free end of the lever 38a, and is made of synthetic rubber, for example. The knob ring 38b is fastened by means of a fastening screw 38c. Since the knob ring 38a is thus mounted to the free end of the clutch operation lever 38, the second side cover 7 is unlikely to be scratched by contact between the second side cover 7 and the knob ring 38a. Also, since the knob ring 38b is detachably fastened by means of the fastening screw 38c, various types of materials such as metal, synthetic resin, elastic substance and cork can be used as the knob ring 38b. Therefore, the angler can select the knob ring 38b to angler's liking.

Figure 7:
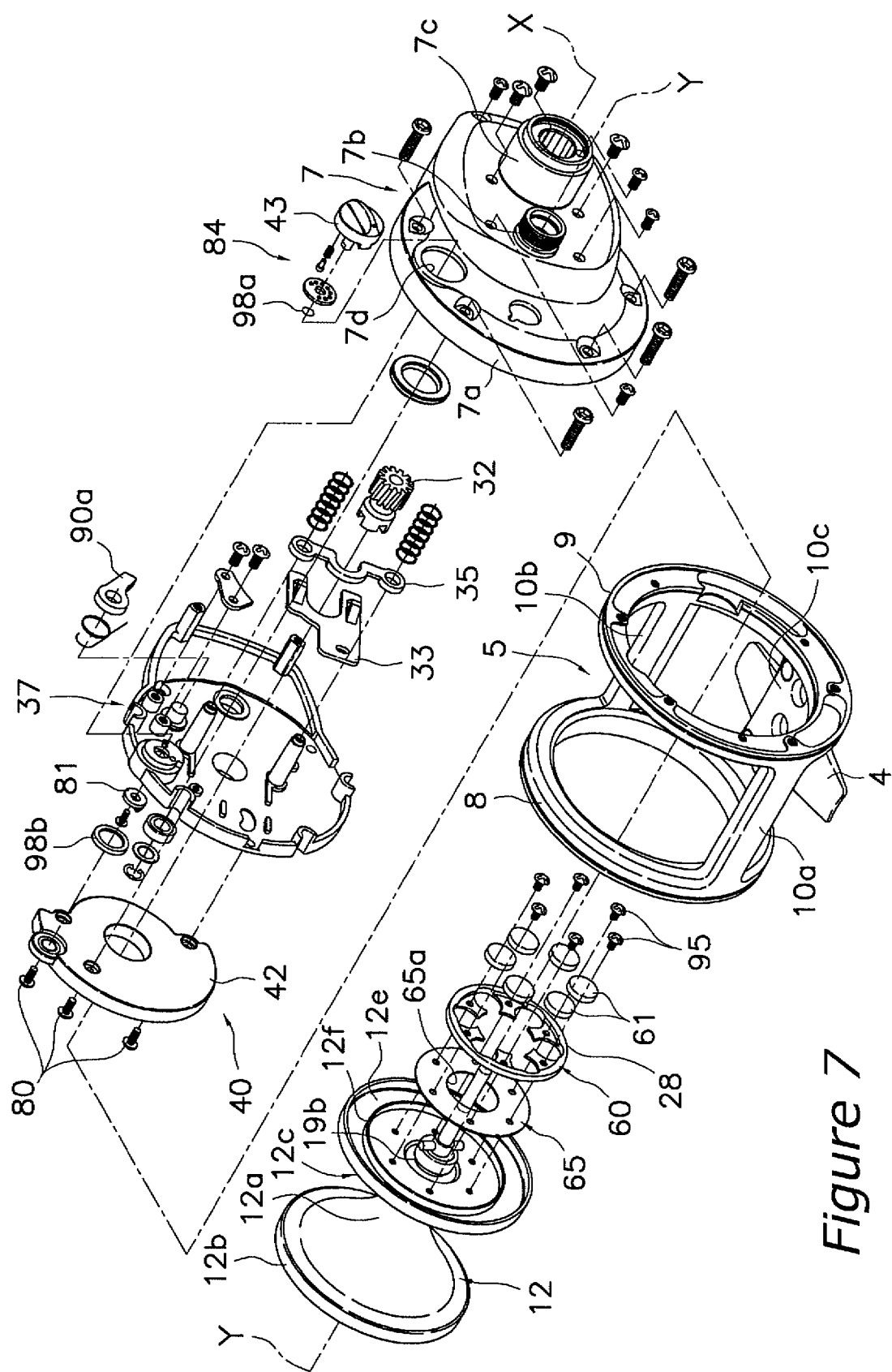
FIG. 7 is an exploded oblique view of the central part of the dual bearing reel.

As shown in FIGS. 3, 4 and 7, the connecting members 10a to 10c are plate-shaped member that are integrally formed with both the side plates 8 and 9 so that the outside surfaces of the connecting members 10a to 10c are smoothly connected to the outer peripheral surfaces of both the side plates 8 and 9. The connecting members 10a to 10c connect a pair of the side plates 8 and 9 at three locations of the front part, the rear part and the bottom part of the reel unit 1, for example. Since the side plates 8 and 9, and a plurality of the connecting members 10a to 10b are integrally formed, deformation such as distortion is unlikely to appear in the reel unit 1 even when a large load is applied to the reel unit 1. Therefore, it is possible to suppress the reduction of winding efficiency. The outer peripheral parts of the connecting members 10a to 10b, and the side plates 8 and 9 are integral, and are machined in the same way as the first side cover 6.

The rod attachment leg 4 is fastened to the bottom connecting member 10c. The rod attachment leg 4 is disposed to run along a central position between the side plates 8 and 9 of the frame 5. The central position is also the central position of the line winding portion of the spool 12.

As shown in FIGS. 1 and 6, the handle 2 includes a crank arm 2a, and a handle knob 2b. The crank arm 2a is non-rotatably mounted on an end of the handle shaft 30. The handle knob 2b is rotatably mounted on one end of the crank arm 2a, and rotates on a shaft that is perpendicular to the end portion of the crank arm 2a. The crank arm 2a is bent along the length thereof so that the handle knob 2b side is close to the reel unit 1.

As shown in FIGS. 2 to 4, the spool 12 is rotatably disposed between the pair of side plates 8 and 9. The spool 12 includes a bobbin portion 12a, and a pair of left and right flange portions 12b and 12c that are formed integrally with both ends of the bobbin portion 12a. The spool shaft 20 is passed through and fastened in the center of the spool 12.

The left and right side shapes of the spool 12 are asymmetric. Specifically, an outer side surface 12d of the flange portion 12b of the spool 12 has a shape different from the shape of an outer side surface 12e of the flange portion 12c. The thickness of the flange portion 12c is thicker than the flange portion 12b, and the rigidity of the flange portion 12c is higher. An annular sensor detection portion 12f is arranged on the outer side surface 12e of the thicker flange portion 12c. Slits (not shown) are formed at a plurality of locations in the sensor detection portion 12f in the circumferential direction, for example. Since the flange portion 12c that has the sensor detection portion 12f is thick, it is possible to suppress deformation of the flange portion 12c. Therefore, it is possible to suppress deterioration of the detection accuracy of the sensor. On the other hand, the thickness of outer side surface on the flange portion 12b side is reduced more than the flange portion 12c side to achieve weight reduction.

The spool shaft 20 is arranged along the shaft axis Y that is parallel to the shaft axis X. For example, the spool shaft 20 is made of a non-magnetic metal such as SUS 304, and passes through the second mechanism mount plate 37 to extend outward of the second side cover 7. The spool shaft 20 is rotatably supported on the reel unit 1 by means of bearings 19a, 19b and 19c. The bearing 19a is mounted to the first mechanism mount plate 36. The bearing 19b is mounted to the second mechanism mount plate 37. The bearing 19c is mounted to the first boss portion 7a of the second side cover 7. An engagement pin 29 that is a component of the clutch mechanism 21 radially passes through and is mounted to a portion of the spool shaft 20 through which the second mechanism mount plate 37 passes.

The aforementioned spool sounding mechanism 14 and the aforementioned spool locking mechanism 15 are arranged in the axial direction between the first mechanism mount plate 36 and the spool 12 on the side opposite to the handle 2 mount side in the reel unit 1. The spool sounding mechanism 14 can be switched between a sound generation enabling state and a sound generation disabling state. In the sound generation enabling state, sound is generated when the spool 12 rotates. The spool locking mechanism 15 can be switched between a locking state and an unlocking state. In the locking state, the spool 12 is locked not to rotate in the line paying-out direction irrespective of the state of the clutch mechanism 21. In the unlocking state, the spool 12 can rotate.

A gear mechanism 18, a clutch mechanism 21, a clutch control mechanism 22, a drag mechanism 23, and a casting control mechanism 24 are arranged in space between the second mechanism mount plate 37 and the second side cover 7 in the reel unit 1 on the handle 2 side. The gear mechanism 18 transmits torque from the handle 2 to the spool 12. The clutch mechanism 21 is arranged between the spool 12 and the gear mechanism 18, and connects/disconnects the rotation of the handle 2. The clutch control mechanism 22 is operated to control ON/OFF of the clutch mechanism 21. The drag mechanism 23 brakes the rotation of spool 12 in the line paying-out direction. The casting control mechanism 24 adjusts the resistance that develops when the spool 12 rotates. Also, a spool braking mechanism 25 is arranged between the spool 12 and the second mechanism mount plate 37. The spool braking mechanism 25 brakes the spool 12 in an electrically controlled manner in casting or the like.

The gear mechanism 18 includes the handle shaft 30, a main gear 31, and a cylindrical pinion gear 32. The handle 2 is coupled to the handle shaft 30 to be rotatable together with the handle shaft 30. The handle shaft 30 is arranged along the shaft axis X. The main gear 31 is fastened to the handle shaft 30. The cylindrical pinion gear 32 meshes with the main gear 31. The handle shaft 30 is rotatably mounted to the second mechanism mount plate 37 and the second side cover 7, and is prohibited from rotating in the line paying-out direction (reverse rotating) by means of a roller type one-way clutch 89 and a ratchet-type one way clutch 90. The one-way clutch 89 is mounted between the second side cover 7 and the handle shaft 30.

Figure 11:
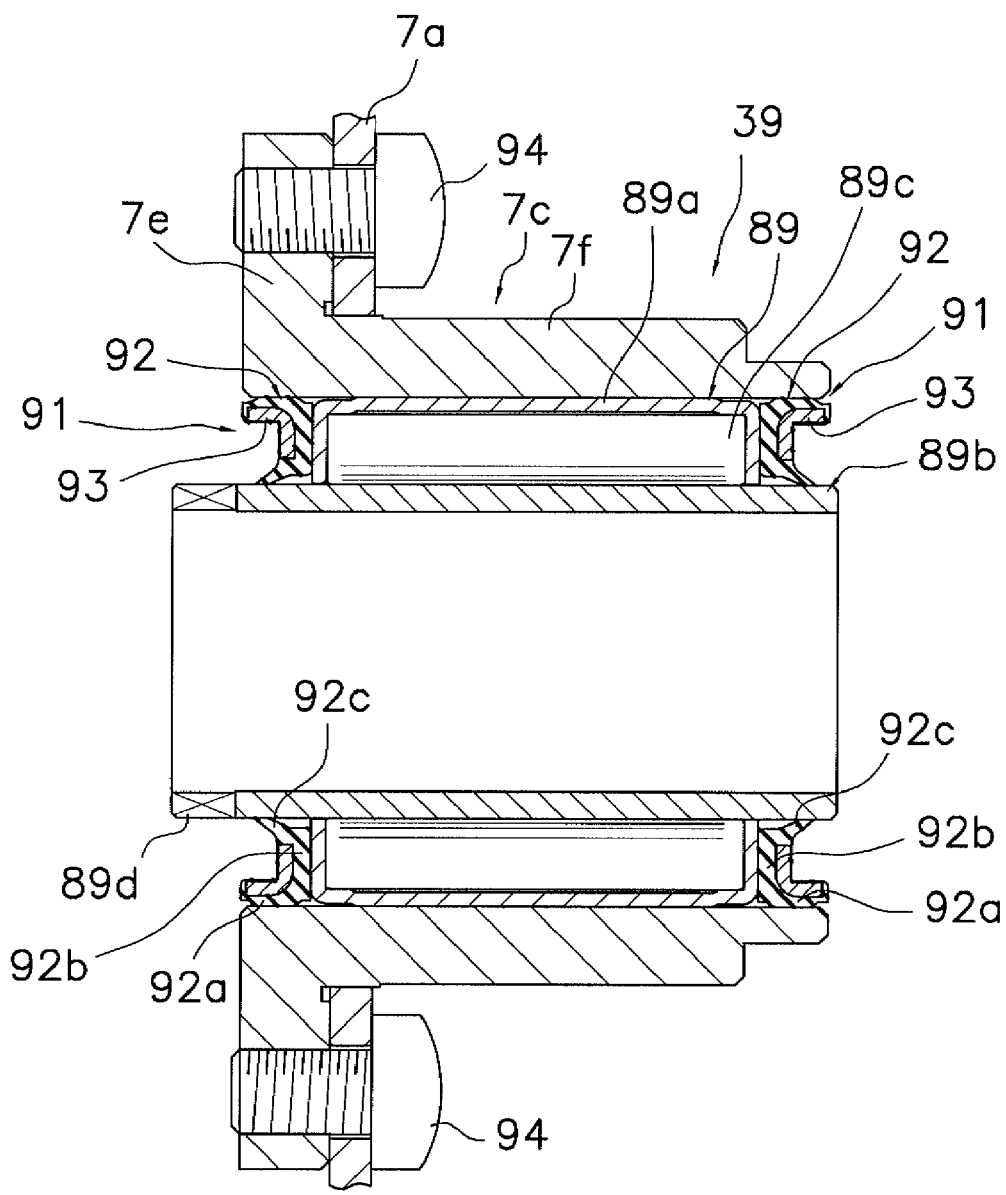
FIG. 11 is a cross-sectional view of a part of a handle shaft support structure.

As shown in FIGS. 3 and 11, the one-way clutch 89 and the second boss portion (an example of the rotation support member) 7c are unitized, and compose a handle shaft support structure 39. The handle shaft support structure 39 includes the second boss portion 7c, the one-way clutch 89, and a pair of annular seal members 91. The second boss portion 7c is fastened to the reel unit 1. The pair of seal members 91 are arranged on the both sides of the one-way clutch 89 to seal the one-way clutch 89. As discussed above, the second boss portion 7c is a cylindrical member with a brim, and includes a flange portion 7e and a cylindrical portion 7f. The flange portion 7e is detachably fastened to the cover unit 7a of the second side cover 7. The cylindrical portion 7f extends axially outward from the flange portion 7e. The one-way clutch 89 is arranged on the inner peripheral surface of the cylindrical portion 7f. The flange portion 7e of the second boss portion 7c is detachably fastened to the inner side surface of the cover unit 7a of the second side cover 7 by means of the screws 94.

The one-way clutch 89 includes an outer ring 89a, an inner ring 89b, and a plurality of rolling elements 89c. The outer ring 89a is non-rotatably coupled to the inner peripheral surface of the cylindrical portion 7f of the second boss portion 7c. The inner ring 89b is arranged on the outer peripheral surface of the handle shaft 30, and is integrally rotatably coupled to the handle shaft 30. The rolling elements 89c are arranged between the outer ring 89a and the inner ring 89b, and are spaced away from each other in the circumferential direction. The inner ring 89b has an axial length longer than the outer ring 89a to protrude from the outer ring 89a in the both axial directions. The seal members 91 seal the clearance between the inner peripheral surface of the second boss portion 7c and the outer periphery of the inner ring 89b, and thus seals the one-way clutch 89. The inner ring 89b includes a pair of engagement protrusions 89d (see FIG. 6) on the axial inside end of the inner ring 89b. The engagement protrusions 89d protrude axially inward. The engagement protrusions 89d engage with a drag washer 23a that is integrally rotatably coupled to the handle shaft 30. Thus, the inner ring 89b is integrally rotatably coupled to the handle shaft 30. The rolling elements 89c are a cylindrical member with a circular shape in cross section, for example, and are retained by a retainer (not shown) to be equally spaced away from each other in the circumferential direction.

The seal members 91 include a seal portion 92 that is made of an elastic substance such as a synthetic rubber, and a backup portion 93 made of metal or any combination thereof to reinforces the seal portion 92. The seal portion 92 includes a cylindrical mount section 92a, a disk section 92b, and a lip section 92c. The mount section 92a is mounted to the inner peripheral surface of the second boss portion 7c. The disk section 92b extends from the mount section 92a toward the inner ring 89b. The lip section 92c is formed in a tapered shape around the end of the disk section 92b, and is in contact with the inner ring 89b. The lip section 92c is inclined from the end of the disk section 92b in a direction away from the one-way clutch 89. The backup portion 93 has an L-shape cross section, and is arranged on the mount section 92a and the disk section 92b of the seal portion 92.

In the thus-configured handle shaft support structure 39, since the one-way clutch 89 and the seal members 91 are mounted to the second boss portion 7c that is detachably mounted to the cover unit 6a of the reel unit 1, the seal members 91 can be easily installed, and the increase of cost of the one-way clutch 89 can be suppressed. Therefore, it is possible to suppress the increase of costs as much as possible and to prevent the intrusion of foreign substance.

The main gear 31 is rotatably mounted on the handle shaft 30, and is integrally rotatably coupled to the handle shaft 30 via the drag mechanism 23. The pinion gear 32 extends from outside of the side plate 9 to the inside thereof, is a tubular member through which the spool shaft 20 passes, and is mounted on the spool shaft 20 so that it is moveable in the axial direction. A meshing groove 32a that meshes with the engagement pin 29 is formed in the left end of the pinion gear 32 in FIGS. 3 and 6. The meshing groove 32a and the engagement pin 29 form the clutch mechanism 21. In addition, a constricted portion 32b is formed in the central portion of the pinion gear 32, and a gear portion 32c that meshes with the main gear 31 is formed on the right end of the pinion gear 32.

The clutch control mechanism 22 includes the clutch operation lever 38, a clutch cam 33, and a clutch yoke 35, as shown in FIGS. 3 and 6. The clutch cam 33 is moved in directions in that the clutch cam 33 is close to and apart from the pinion gear by the pivoting of the clutch operation lever 38. The clutch yoke 35 engage with the constricted portion 32b of the pinion gear 32, and moves the pinion gear 32 along the spool shaft 20. This clutch yoke 35 is moved in the axial direction of the spool shaft 20 by the clutch cam 33 that is moved by the pivoting operation of the clutch operation lever 38. This movement moves the pinion gear 32 in the axial direction of the spool shaft, and switches the clutch mechanism 21 between a clutch-on state and a clutch-off state. If the pinion gear 32 moves along the spool shaft 20 and the engagement pin 29 engages with the meshing groove 32a, rotational force will be transmitted between the spool shaft 20 and the pinion gear 32. This state is the connected state (the clutch-on state). If the engagement pin 29 is disengaged from the meshing groove 32a, the rotational force will not be transmitted between the spool shaft 20 and the pinion gear 32. This state is the disconnected state (the clutch-off state). In the clutch-off state, the spool 12 will freely rotate. The clutch yoke 35 is urged in a direction in that the meshing groove 32a and the engagement pin 29 will engage with each other, i.e., in the clutch-on state, by means of a coil spring 34.

The drag mechanism 23 includes four metal drag washers 23a to 23d that are arranged around the handle shaft 30, for example, and four drag disks 23e that are arranged between the drag washers 23a to 23d, as shown in FIG. 6. The drag washers 23a, 23c, and 23d are integrally rotatably coupled to the handle shaft 30. The drag washer 23b is integrally rotatably coupled to the main gear 31. The drag washer 23d has ratchet teeth 23f that are formed around the periphery of the drag washer 23d, and serves as a ratchet wheel that engages with a ratchet pawl 90a of the one-way clutch 90.

The casting control mechanism 24 includes a plurality of friction plates 51, and a braking cap 52. The friction plates 51 are arranged to sandwich the spool shaft 20. The braking cap 52 serves to adjust the force with which the friction plates 51 are pressed against the spool shaft 20. The left friction plate 51 is mounted inside the bearing 19a.

The spool sounding mechanism 14 can generate sound in accordance with the rotation of the spool 12, and can be switched between the sound generation enabling state and the sound generation disabling state by operation of the sounding knob 16.

Figure 8:
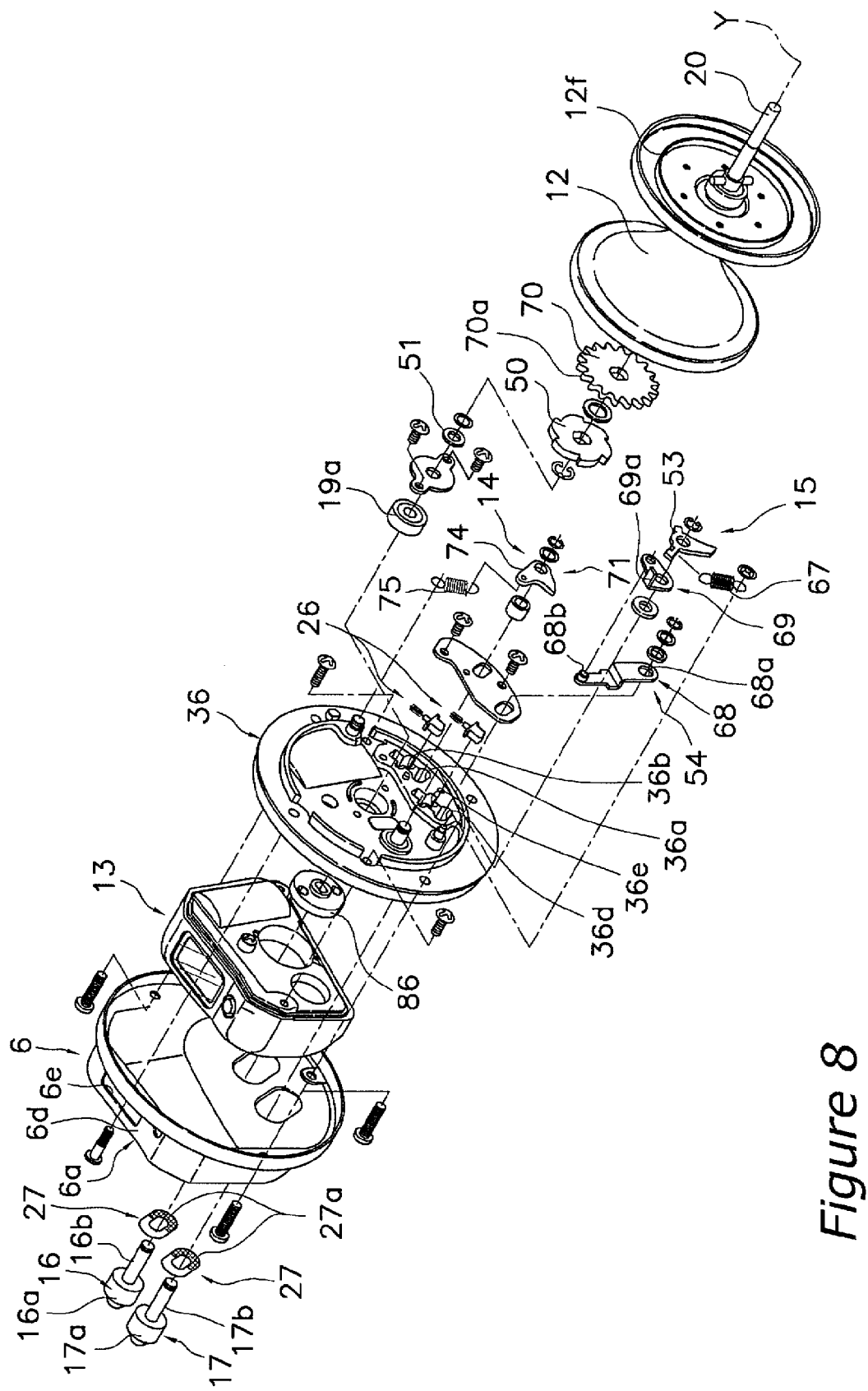
FIG. 8 is an exploded oblique view of the left-side part of the dual bearing reel.

The sounding knob 16 includes a knob portion 16a, and a shaft-shaped portion 16b, as shown in FIGS. 5 and 8. The knob portion 16a is exposed from the first side cover 6, and has a larger diameter. The shaft-shaped portion 16b is formed integrally with the knob portion 16a. The knob portion 16a is moved along the opening 6b that is formed in the first side cover 6. As discussed above, the opening 6b is formed to extend substantially along the diameter of the first side cover 6. Accordingly, the sounding knob 16 is arranged to be moved substantially along the diameter of the first side cover 6, and can be operated to be positioned at two positions from the outside of the first side cover 6.

A sheet member 27 as an indicating means is mounted on the back surface of the knob portion 16a around the shaft portion 16b in a boundary part between the opening 6b of the first side cover 6 and the first mechanism mount plate 36. The sheet member 27 is an oval member that is made of transparent resin. The lower half of the sheet member 27 shown as a hatched area on the back surface of the sheet member 27 is painted in red as an ON indicating portion 27a. In addition to this, as for the sheet member 27 that is painted in red, its whole back surface is further painted in white. In the case where its whole back surface is painted in white, the outer side surface of the first mechanism mount plate 36 is invisible. Accordingly, the red color can be distinctive. Also, since only the back surface of the sheet member 27 is painted, the front and back surfaces of the sheet member 27 can be easy to distinguish from each other. Therefore, it is possible to prevent incorrect attachment of the sheet member 27 in assembly. Since the thus-configured sheet member 27 is interposed, the slide resistance of the knob portion 16a can be reduced. In addition to this, when the knob portion 16a is positioned at the sound generation enabling position, the ON indication portion 27a of the sheet member 27 that is painted in red is largely exposed. The angler can easily recognize the sound generation enabling state.

Figure 9:
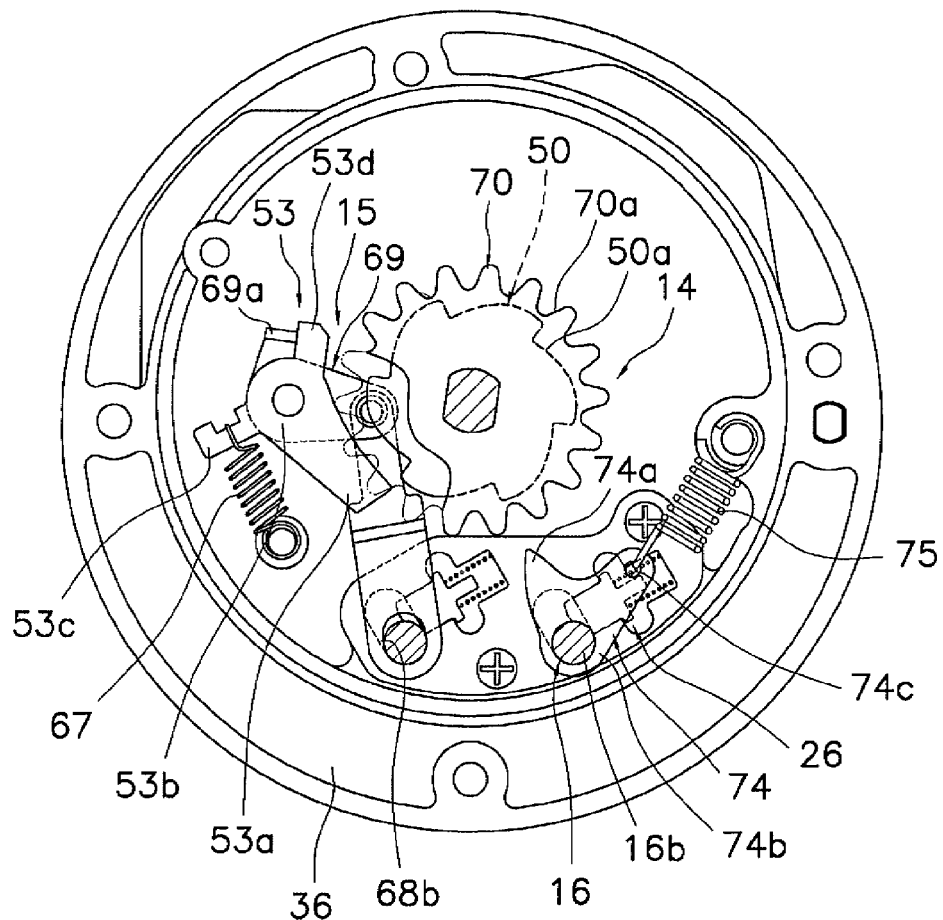
FIG. 9 is a view showing the operation disabling state of a spool sounding mechanism and a spool locking mechanism.
Figure 10:
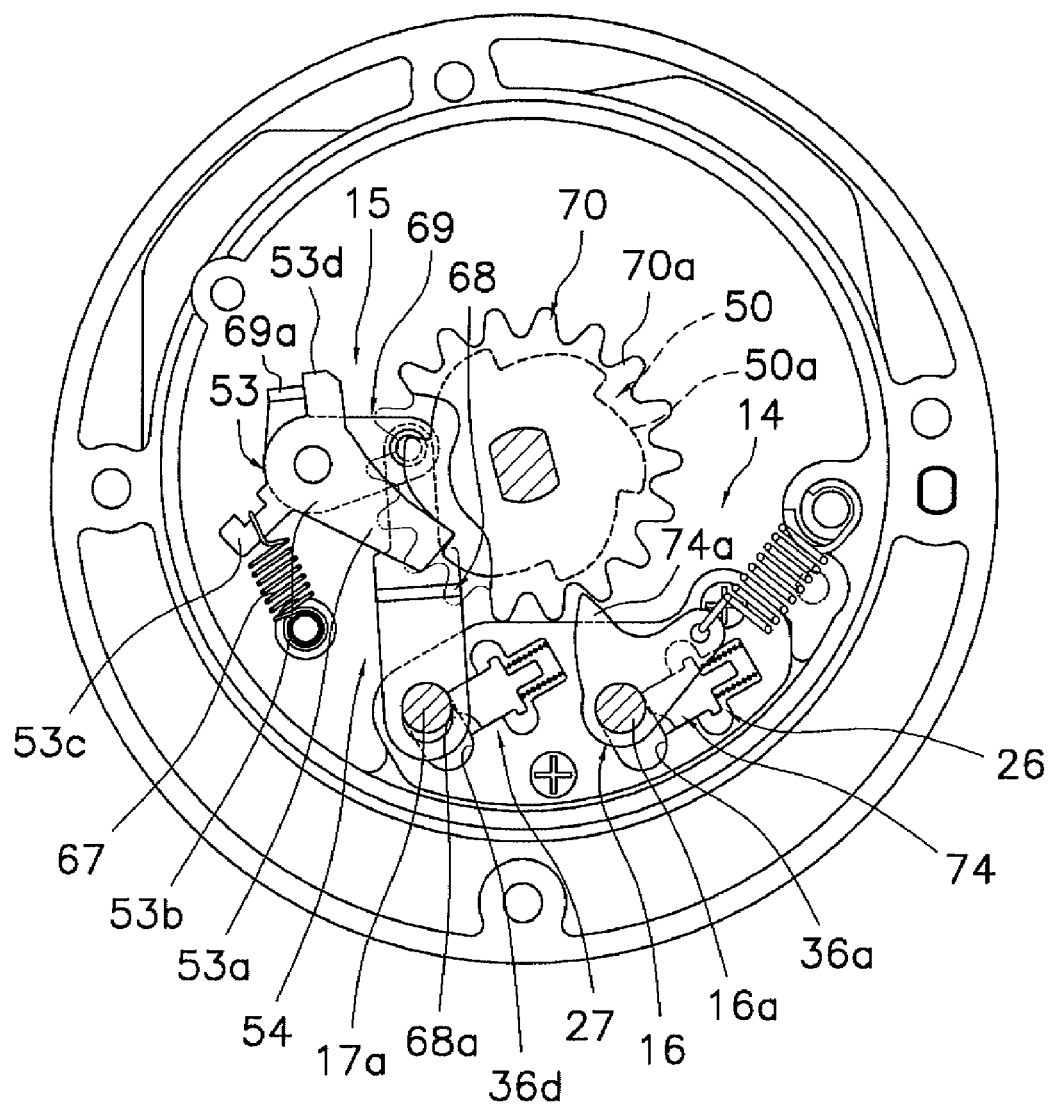
FIG. 10 is a view showing the operation enabling state of the spool sounding mechanism and the spool locking mechanism.
Figure 12:
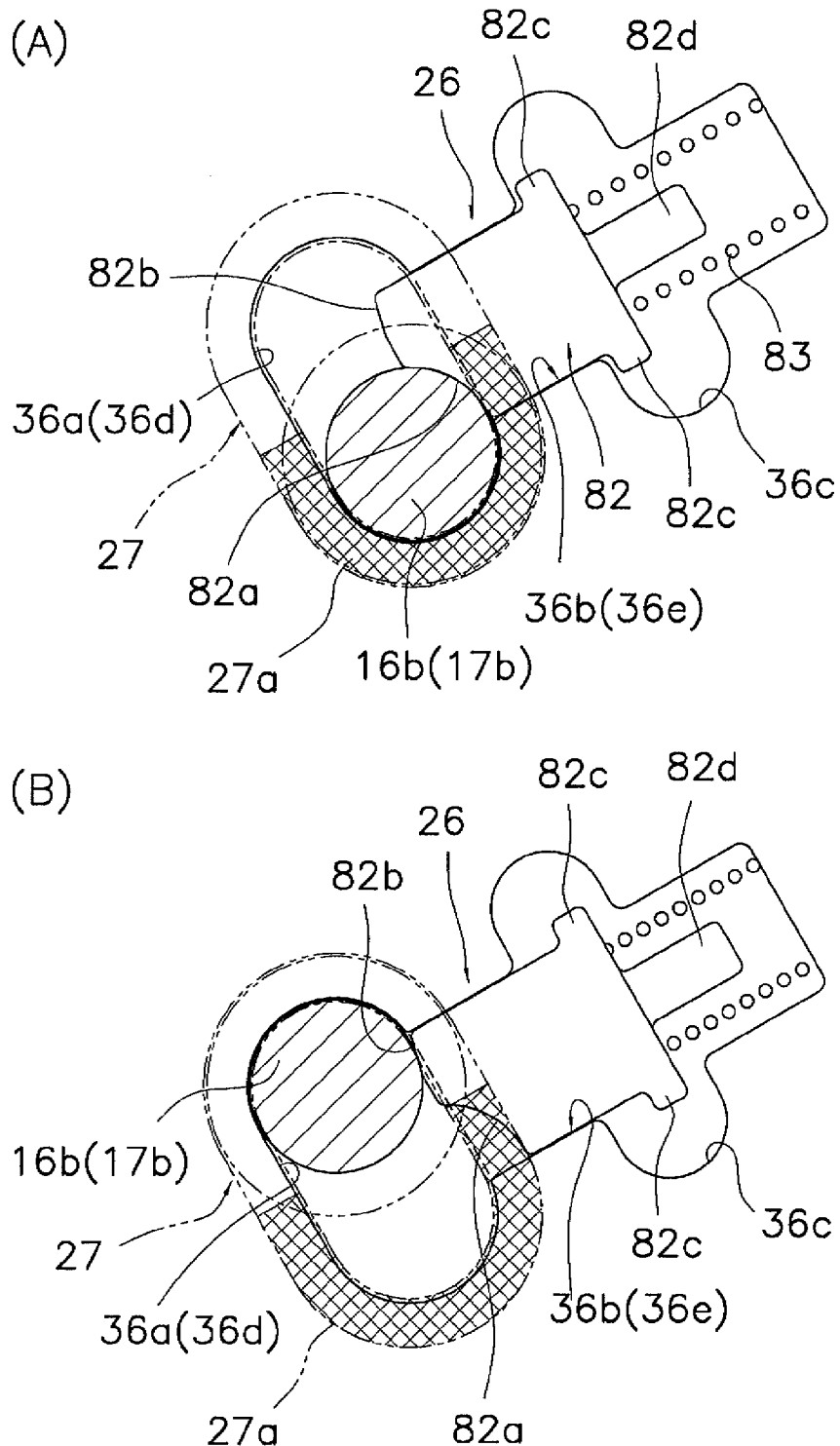
FIG. 12 is an enlarged cross-sectional view showing the configuration of a biasing mechanism.

The shaft portion 16b is guided along an oval guiding opening 36a that is formed to extend substantially along the diameter of the first mechanism mount plate 36 so that the front of the first mechanism mount plate 36 is lower. The shaft portion 16b can be moved between the sound generation disabling position and the sound generation enabling position. The sound generation disabling position is apart from the bulging portion 6a as shown in FIGS. 9 and 12 (A). The sound generation enabling position is close to the bulging portion 6a as shown in FIGS. 10 and 12 (B). The biasing mechanism 26 biases the shaft portion 16b to toggle the shaft portion 16b between the sound generation disabling position and the sound generation enabling position in directions in that the shaft portion 16b is close to and apart from the bulging portion 6a.

The biasing mechanism 26 is accommodated in an accommodation recessed portion 36b that is formed in the first mechanism mount plate 36 to communicate to the guiding opening 36a and to extend so that the front of the accommodation recessed portion 36b is higher as shown in FIG. 12. The biasing mechanism 26 includes a toggle member 82, and a coil spring 83. The toggle member 82 is mounted to the accommodation recessed portion 36b to be able to advance/retract in directions in that the toggle member 82 is close to and is apart from the shaft portion 16b. The coil spring 83 biases the toggle member 82 toward the shaft portion 16b.

The toggle member 82 is a plate-shaped member, and has two different press surfaces 82a and 82b on its fore end. The press surface 82a is curved along the outer shape of the shaft portion 16b, and biases the shaft portion 16b to hold the shaft portion 16b at the sound generation disabling position. The press surface 82b is linearly inclined to an inclination extent smaller than the press surface 82a, and biases the shaft portion 16b to hold the shaft portion 16b at the sound generation enabling position. For this reason, the biasing force by the press surface 82b is smaller than the biasing force by the press surface 82a.

The toggle member 82 includes a pair of interlocking protrusions 82c that protrude on both sides in the middle of the toggle member 82, and a spring guide 82d that protrudes rearward from the base end surface of the toggle member 82. The interlocking protrusion 82c is interlocked with connection portions 36c to restrict the advancing movement of the toggle member 82. The connection portions 36c are formed in the accommodation recessed portion 36b to expand on the both sides of the accommodation recessed portion 36b. The spring guide 82d prevents the coil spring 83 from falling off. The coil spring 83 is attached in a compression state on the outer periphery side of the spring guide 82d in the accommodation recessed portion 36b.

In this biasing mechanism 26, the biasing force at the sound generation enabling position shown in FIG. 12 (A) is larger than the biasing force at the sound generation disabling position shows in FIG. 12 (B). Accordingly, the operation of the sounding knob 16 from the sound generation disabling position to the sound generation enabling position is heavy compared with the operation from the sound generation enabling position to the sound generation disabling position. Therefore, it is possible to provide appropriate click feeling in switching operation to the sound generation enabling state. In particular, since the operation toward the bulging portion 6a sets the sound generation enabling state, even in the case where the operation toward the bulging portion 6a in that the angler can easily forcefully press the knob portion 16a is heavy, the angler can easily perform this operation. In addition to this, since the operation apart from the bulging portion 6a, i.e., the switching operation from the sound generation enabling state to the sound generation disabling state, is light, the angler can also easily perform this operation.

The sounding knob 16 is operated to switch ON/OFF of the spool sounding mechanism 14 at a high frequency compared with the spool locking mechanism 15. The sounding knob 16 is arranged along the diameter of the first side cover 6 so that the angler can easily forcefully press the sounding knob 16. Therefore, the angler can more easily perform the ON/OFF operation of the spool sounding mechanism 14 that is performed at a high frequency.

The spool sounding mechanism 14 includes a sounding portion 70, and a striking portion 71 as shown in FIGS. 5, and 8 to 10. The sounding portion 70 is non-rotatably mounted to the spool shaft 20, and has protruding and recessed parts 70a on the outer periphery of the sounding portion 70. The striking portion 71 strikes the sounding portion 70.

The sounding portion 70 is non-rotatably mounted to the spool shaft 20 on the spool 12 side. The sounding portion 70 is a disk-shaped metal member that is provided with a plurality of gear teeth shaped protruding and recessed parts 70a that are spaced away in the circumferential direction on the outer periphery of the disk-shaped metal member.

The striking portion 71 includes a pawl member 74, and a biasing member 75. The pawl member 74 is pivotably mounted to the end of the shaft portion 16b of the sounding knob 16. The tip of the pawl member 74 can strike the protruding and recessed parts 70a. The biasing member 75 biases the pawl member 74 towards a neutral position in that the pawl member 74 strikes the protruding and recessed parts 70a.

The pawl member 74 is a metal member, and includes a contact portion 74a, a mount portion 74b, and a spring hook portion 74c. The contact portion 74a is formed on the tip of the pawl member 74 to come in contact with the protruding and recessed parts 70a, and is tapered down toward the tip of the contact portion 74. The mount portion 74b is pivotably mounted to the end of the shaft portion 16b. The spring hook portion 74c extends from the mount portion 74b in a direction different from the contact portion 74a. The pawl member 74 is moved between a sounding position shown by a solid line in FIG. 9 and a withdrawn position shown in FIG. 10 by the moving operation of the sounding knob 16. In the sounding position, the contact portion 74a comes in contact with the protruding and recessed parts 70a. In the withdrawn position, the contact portion 74a is apart from the protruding and recessed parts 70a.

The biasing member 75 is a coil spring. One end of the biasing member 75 is interlocked with the first mechanism mount plate 36, and the other end is interlocked with the spring hook portion 74c.

In thus-configured spool sounding mechanism 14, in the case where angler's left hand (hand not used to operate the handle 2) thumb is put on the bulging portion 6a, for example, when the angler operates the sounding knob 16 to move the sounding knob 16 toward the bulging portion 6a with angler's middle or third finger, the sounding knob 16 is positioned at the sound generation enabling position as shown in FIG. 10. When the sounding knob 16 is positioned at the sound generation enabling position, the contact portion 74a of the pawl member 74 comes in contact with the sounding portion 70. In this configuration, since the sounding knob 16 is arranged at the fishing rod attachment side of the bulging portion 6a, the angler can operate the sounding knob 16 in a manner that the angler easily forcefully flexes angler's finger by using the bulging portion 6a. Therefore, it is possible to easily perform ON/OFF sound generation switching operation.

When the spool 12 rotates in this state, the pawl member 74 that is biased toward the neutral position by the coil spring 75 will oscillate and generate sound. In the case where the sounding knob 16 is positioned at the sound generation enabling position, as discussed above, the ON indication portion 27a of the sheet member 27 is largely exposed. The angler can surely recognize the sound generation enabling state.

On the other hand, when the angler pushes the sounding knob 16 with angler's finger to operate the sounding knob 16 from the sound generation enabling position to the sound generation disabling position, as shown in FIG. 9, the pawl member 74 is positioned at the withdrawn position. Thus, even if the spool 12 rotates, sound is not generated. Accordingly, the rotational resistance of the spool 12 is reduced. In the case where the sounding knob 16 is operated to be moved to the sound generation disabling position, since the biasing force at the sound generation enabling position by the biasing mechanism 26 is small, the angler can perform this operation with a small force. Therefore, even in the case where the sounding knob 16 is operated to be moved in a direction in that the angler does not easily forcedly push the sounding knob 16 and that the angler stretches angler's finger, the switching operation can be easily performed.

The spool locking mechanism 15 can prohibit the reverse rotation in the line paying-out direction of the spool 12 irrespective of the state of the clutch mechanism 21, and can be switched between the locking state and the unlocking state. In the case where the spool locking mechanism 15 is brought in the reverse-rotation prohibited state, the rotation of the spool 12 in the line paying-out direction is completely locked. In this case, it is useful to cut the fishing line if the tackle is caught by a snag in the water (i.e., NEGAKARI in Japanese (so to speak an event where the tackle is snagged)), for example. The spool locking mechanism 15 can be switched between a locked state and an unlocked state by operation of the locking knob 17.

As shown in FIG. 8, the locking knob 17 has the same configuration as the sounding knob 16, and is arranged at the rear of the sounding knob 16 in parallel to the sounding knob 16. The locking knob 17 includes a knob portion 17a that is exposed from the first side cover 6, and a shaft portion 17b. The knob portion 17a is moved along the opening 6c. Also, the shaft portion 17b is guided by an oval guiding opening 36d shown in FIG. 8, and can be moved between an unlocked position and a locked position. The unlocked position is apart from the bulging portion 6a as shown in FIGS. 9 and 12 (A). The locked position is close to the bulging portion 6a as shown in FIGS. 10 and 12 (B). The biasing mechanism 26 that is provided with an accommodation recessed portion 36e similarly to the sounding knob 16 biases the shaft portion 17b to toggle the shaft portion 17b between the sound generation disabling position and the sound generation enabling position in directions in that the shaft portion 17b is close to and apart from the bulging portion 6a. In addition to this, the sheet member 27 is interposed similarly to the sounding knob 16. The sheet member 27 allows the angler to easily recognize the locked state.

The spool locking mechanism 15 includes a ratchet wheel 50, a ratchet pawl 53, and a coupling mechanism 54 as shown in FIGS. 8 to 10. The ratchet wheel 50 is non-rotatably mounted to the spool shaft 20 in the position that is apart from the spool 12 relative to the sounding portion 70. The ratchet pawl 53 meshes with the ratchet wheel 50. The coupling mechanism 54 couples the ratchet pawl 53 and the locking knob 17. Ratchet teeth 50a with the shape of saw teeth are formed on the outer peripheral surface of the ratchet wheel 50 to prohibit the rotation in the line paying-out direction (clockwise rotation in FIGS. 9 and 10) by means of the ratchet pawl 53, and allow the rotation in the line-winding direction.

The ratchet pawl 53 is moved between the locked position and the unlocked position. In the locked position shown in FIG. 10, the ratchet pawl 53 meshes with the ratchet teeth 50a of the ratchet wheel 50 in accordance with the locking knob 17 that is exposed from the opening 6c of the first side cover 6. In the unlocked position shown in FIG. 9, the ratchet pawl 53 is apart from the ratchet teeth 50a.

Specifically, the ratchet pawl 53 is pivotably mounted to the first mechanism mount plate 36, and includes a pawl portion 53a, a mount portion 53b, a spring hook portion 53c and a abutment portion 53d. The pawl portion 53a comes in contact with the ratchet wheel 50. The mount portion 53b is mounted to the first mechanism mount plate 36. The spring hook portion 53c extends in the radial direction from the mount portion 53b. The abutment portion 53d extends between the spring hook portion 53c and the pawl portion 53a in the radial direction from the mount portion 53b. One end of a coil spring 67 that biases the ratchet pawl 53 toward the locked position is interlocked with the spring hook portion 53c. The other end of the coil spring 67 is interlocked with the first mechanism mount plate 36.

The coupling mechanism 54 includes a first link member 68 that is pivotably coupled to the end of the shaft portion 17b of the locking knob 17, and a second link member 69 that is pivotably coupled to the first link member 68. The first link member 68 is a plate-shaped member. The base end of the first link member 68 is pivotably coupled to the shaft portion 17b. A coupling opening 68a is formed in an oval shape at the base end of the first link member 68 to provide the shaft portion 17b with a small clearance in the vertical direction. A coupling shaft 68b that couples the second link member 69 is fixed on the end of the first link member 68.

One end of the second link member 69 is pivotably coupled to the coupling shaft 68b of the first link member 68. The other end of the second link member 69 is pivotably supported on the first mechanism mount plate 36 at the same position as the ratchet pawl 53. The interlocking protrusion 69a is formed on the peripheral surface of the other end of the second link member 69 to protrude in the radial direction. The interlocking protrusion 69a can contact the abutment portion 53d of the second link member 69.

When operation is performed from the locked position shown in FIG. 10 to the unlocked position shown in FIG. 9, the thus-configured interlocking protrusion 69a transmits the pivoting movement of the second link member 69 in the clockwise direction in FIG. 10 to the ratchet pawl 53 so that the ratchet pawl 53 pivots to the unlocked position. Also, when operation is performed from the unlocked position shown in FIG. 9 to the locked position shown in FIG. 10, the second link member 69 pivots in the counterclockwise direction in FIG. 9 to allow the ratchet pawl 53 that is biased by the coil spring 67 to pivot in the counterclockwise direction in FIG. 9. Thus, the ratchet pawl 53 pivots to the locked position.

In thus-configured spool locking mechanism 15, in the case where angler's left hand (hand not used to operate the handle 2) thumb is put on the bulging portion 6a, for example, when the angler operates the locking knob 17 to move the locking knob 17 toward the bulging portion 6a with angler's middle or third finger, the locking knob 17 is positioned at the locked position. When the locking knob 17 is positioned at the locked position, the first link member 68 is moved upward. When the first link member 68 is moved upward, the second link member 69 is pivoted in the counterclockwise direction in FIG. 9 by the biasing force of the coil spring 67 via the ratchet pawl 53. Thus, as shown in FIG. 10, the pawl portion 53a of the ratchet pawl 53 comes in contact with the ratchet wheel 50. As a result, the rotation of the spool 12 in the line paying-out direction is locked. In this configuration, since the locking knob 17 is arranged at the fishing rod attachment side of the bulging portion 6a, the angler can operate the locking knob 17 with the finger that can be easily forcefully bent by using the bulging portion 6a. Therefore, it is possible to easily perform ON/OFF lock switching operation.

In this state, when the spool 12 rotates in the line-winding direction, the ratchet pawl 53 that is biased toward the locked position by the coil spring 67 will oscillate and generate sound. If the spool 12 rotates in the line paying-out direction, the ratchet tooth 50a contacts the pawl portion 53a of the ratchet pawl 53 so that the spool 12 is locked not to rotate. In the case where the locking knob 17 is positioned at the locked position, as discussed above, the ON indication portion 27a of the sheet member 27 is largely exposed. The angler can surely recognize the locked state.

On the other hand, when the angler pushes the locking knob 17 with angler's finger to operate the locking knob 17 from the locked position to the unlocked position, as shown in FIG. 9, the ratchet pawl 53 is positioned at the withdrawn position. Thus, even if the spool 12 rotates in the line paying-out direction, the spool 12 is not locked. In the case where the locking knob 17 is operated to be moved to the unlocked position, since the biasing force at the locked position by the biasing mechanism 26 is small, the angler can perform this operation with a small force. Therefore, even in the case where the locking knob 17 is operated to be moved in a direction in that the angler does not easily forcedly push the locking knob 17 and that the angler stretches angler's finger, the switching operation can be easily performed.

As shown in FIGS. 3, 4, 7 and 14, the spool brake mechanism 25 includes a spool brake unit 40, a rotational speed sensor 41, a spool control unit 42, and the brake switch knob 43. The spool brake unit 40 is arranged between the spool 12 and the reel unit 1. The rotational speed sensor 41 serves to detect tension that is applied to the fishing line that is paid out from the spool 12 during casting or the like. The spool control unit 42 electrically controls the spool brake unit 40 with any one of eight braking modes in strength adjustment. The strength adjustment knob 43 serves to select the eight braking modes.

The spool brake unit 40 is electrically controlled to brake the spool 12 by generating electricity. The spool braking unit 40 includes a rotor 60, a plurality of coils 62, and a switch element 63. The rotor 60 includes a plurality of magnets that are arranged in the rotational direction so that the magnetic poles of the magnets are alternately changed. The rotor 60 rotates in association with the spool 12. The coils 62 are mounted to the reel unit 1 so that the end surfaces of the coils 62 are opposed to the side surface of the rotor 60. The coils 62 are spaced at an interval away from each other in the circumferential direction. The coils 62 are serially connected to each other. The winding diameter of the coil 62 is greater than the axial length of the coil 62. The switch element 63 is connected to both ends of the plurality of the serially connected coils 62. The spool brake unit 40 controls the spool 12 by turning the flow of electricity generated by the relative rotation between the rotor 60 and the coil 62 on and off by means of the switch element 63. The braking force generated by the spool brake unit 40 will increase in accordance with the length of time the switch element 63 is on.

The rotor 60 includes six disk-shaped magnets 61, and a magnet retaining portion 28. The magnets 61 are arranged in the rotation direction at the outer side surface 12e side of the flange portion 12c on the right side of the spool 12. The magnet retaining portion 28 retains the six magnets so that the magnets are equally spaced away from each other in the circumferential direction. The six magnets 61 are arranged in the circumferential direction so that the magnetic poles of the magnets 61 are alternately changed. The magnet retaining portion 28 is a ring-shaped member made of a synthetic resin, and is fastened to the outer side surface 12e of the flange portion 12c of the spool 12 by screws 95, for example. A yoke washer 65 that is made of a magnetic substance and has a thorough opening 65a at its center is arranged between the magnet retaining portion 28 and the outer side surface 12e. The magnets 61 are retained on the yoke washer 65 by their magnetic force, and are adhered to the magnet retaining portion 68 and the yoke washer 65 with an adhesive agent.

The coils 62 are the coreless type, which serve to prevent cogging and make the rotation of the spool 12 smooth. A yoke is not provided. The coils 62 are arranged at six locations on the circumference of a circle that are equally spaced away from each other as shown in FIG. 14. Core wire is wound about an axis in parallel to the shaft axis Y of the spool shaft 20 to form rounded sector shapes as the coil 62. The sector shapes as the coil 62 are spaced away from each other in the circumference direction about the shaft axis X. The sector shapes as the coil 62 that are formed by the wound core wire are opposed to the magnets 61 and are arranged in the magnetic field of the magnets 61. This configuration can improve electric power generation, and can provide a high braking force. The entire length L of the coil 62 along the shaft axis X (FIG. 14) is not more than ¼ the diagonal line length D of the sector (FIG. 13) as the maximum value of the winding diameter of the coil 62. The six coils 62 are serially connected, and both ends of the serially connected coils are connected to the switch element 63. The coils 62 are arranged at a substantially equal distance between the coil 62 and the magnet 61. Because of this, the gap between the coils 62 and the magnets 61 during rotation can be uniformly maintained. The six coils 62 are mounted to a circuit board 66 (discussed later). An insulating film covers the periphery of the coil 62.

The switch element 63 includes, for example, two parallel connected FET (field effect transistors) that can switch on and off at a high speed. The serially connected coils 62 are connected to each drain terminal of the FET. The switch element 63 is mounted to a surface (surface opposed to the flange portion 12c) of the circuit board 66.

The rotational speed sensor 41 employs, for example, a reflection type electro-optical sensor that includes a light portion and a receptor portion, and is disposed on a surface of the circuit board 66 that faces the flange portion 12c of the spool 12. The rotational speed sensor 41 is a sensor unit that includes the light portion and the receptor portion that are unitarily disposed in a case. The rotational speed sensor 41 detects the slits of the annular sensor detection portion 12f that is formed in the outer side surface 12e of the flange portion 12c. The rotational speed of the spool 12 is detected based on pulse signals from the receptor portion of the rotational speed sensor 41 so that the tension that is applied to the fishing line is detected.

The strength adjustment knob 43 adjusts braking patterns of eight strength braking modes (discussed later). The strength adjustment knob 43 is pivotably mounted to the second side cover 7, and is exposed through an opening 7d that opens on the upper part of the second side cover 7.

As shown in FIG. 14, the circuit board 66 is a washer-shaped, ring-shaped board that has a circular opening at its center and an arc-shaped cut-off portion corresponding to the mount portion of the handle shaft 30 and the like. The circuit board 66 is arranged at the inner side surface side of the second mechanism mount plate 37 substantially concentrically with the shaft axis Y. A plurality of controlling elements including a microcomputer, various types of ICs, and the like are installed on the surface of the circuit board 66. The circuit board 66 is fastened to the inner side surface of the second mechanism mount plate 37 by three screws 80, for example.

As shown in FIG. 14, the controller 55 is for example composed of a microcomputer 59 disposed on the circuit board 66 and provided with a CPU 55a, a RAM 55b, a ROM 55c and an I/O interface 55d. A control program is stored in the ROM 55c of the controller 55, as well as the braking patterns of eight strength braking modes.

The rotational speed sensor 41 that detects the rotational speed of the spool 12, and a knob position sensor 45 for detecting the rotational position of the strength adjustment knob 43 are connected to the controller 55. In addition, the gates of each FET of the switch element 63 are connected to the controller 55. The controller 55 controls the on/off state of the switch element 63 of the spool brake unit 40 in response to pulse signals from each sensor 41, 45 by means of PWM (pulse width modulated) signals having cycles of, for example, $\frac{1}{1000}$ seconds that are generated by the control program (described below). More specifically, the controller 55 controls the on/off state of the switch element 63 at the braking patterns of eight strength braking modes with duty ratios D that vary in accordance with elapsed time in casting. Electric power is supplied to the controller 55 from an electricity storage element 57. This electric power is also supplied to the rotational speed sensor 41 and the knob position sensor 45.

The knob position sensor 45 reads out the rotational position of the strength adjustment knob 43. The knob position sensor 45 includes eight types of patterns (not shown) that are formed on the back surface of the circuit board 66, and a brush member 81 that pivots integrally with the strength adjustment knob 43, for example. The pivotal position of the strength adjustment knob 43 is detected based on a short circuit in one of the patterns by the brush member 81

The electricity storage element 57 employs, for example, an electrolytic condenser, and is connected to a rectifier circuit 58. The rectifier circuit 58 is connected to the switch element 63, and both converts alternating current from the spool brake unit 40 to direct current (the spool brake unit 40 having the rotor 60 and coils 62 and functions as an electric generator) and stabilizes the voltage to supply it to the electricity storage element 57. Note that the rectifier circuit 58 and the electricity storage element 57 are both provided on the surface of the circuit board 66. Thus, all the parts that are mounted to the circuit board 66 are contained on the surface of the circuit board 66. Therefore, it is possible to simplify the shape of the circuit board 66.

Figure 13:
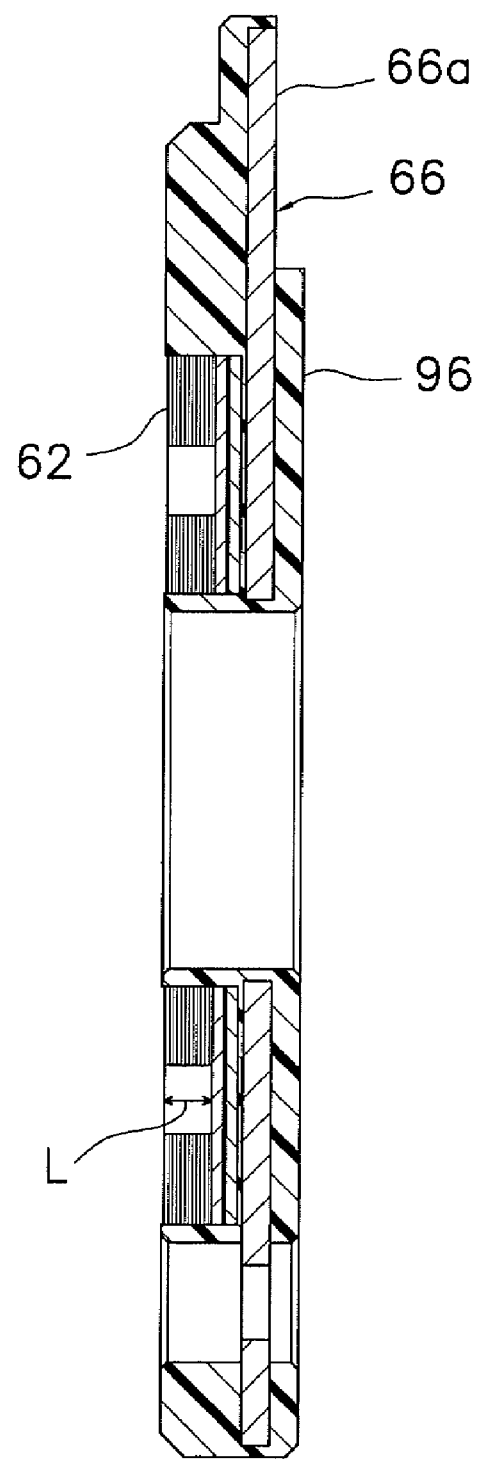
FIG. 13 is a cross-sectional view of a circuit board.
Figure 14:
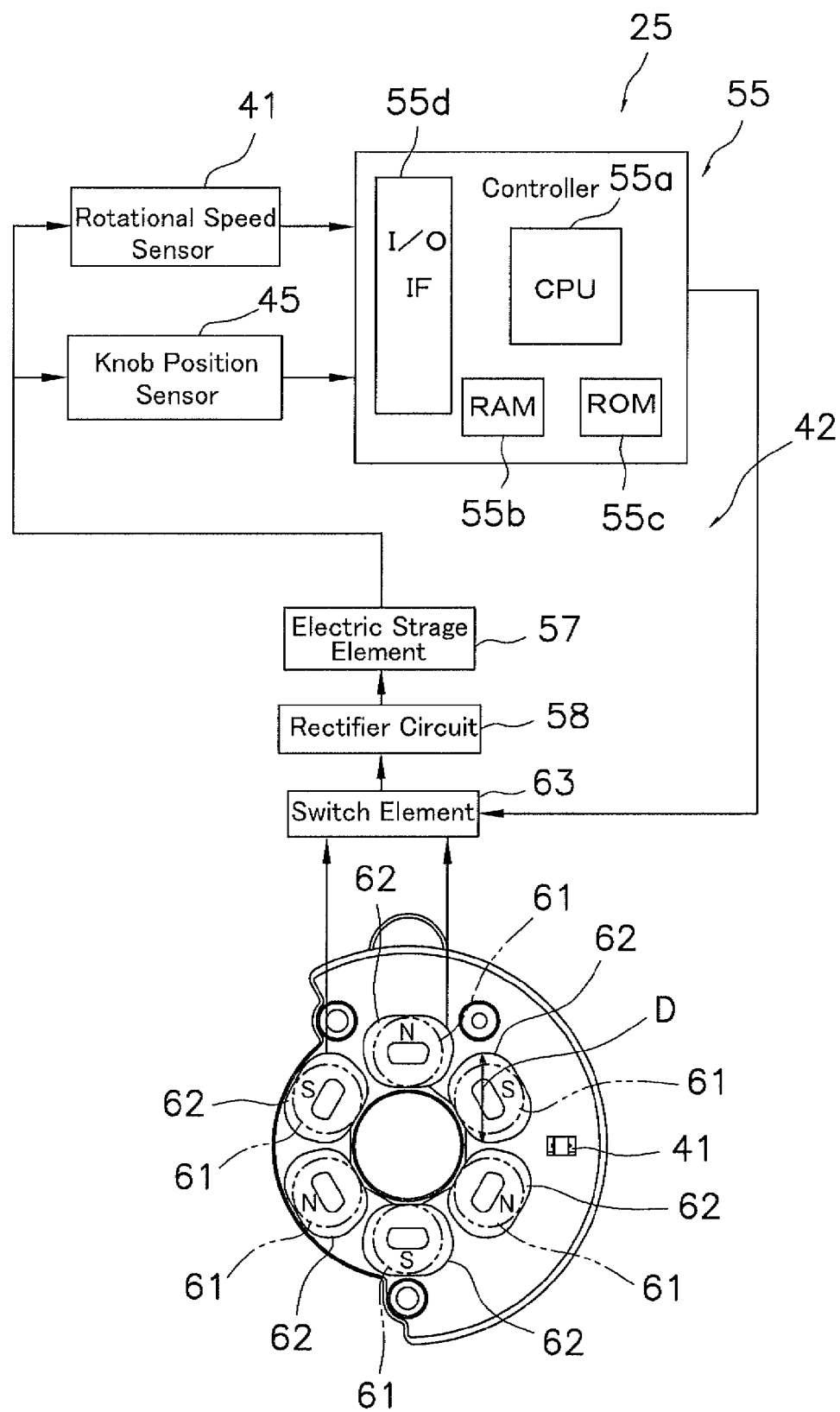
FIG. 14 is a block diagram showing the structure of a spool braking mechanism.

Note that, as shown in FIG. 13, the front and back surfaces of the circuit board 66 are covered by an insulating film 96 that is formed by hot melting, for example, except for the pattern formation portion 66a in which the position detecting patterns are formed. Accordingly, the board is water-tightly sealed, and troubles such as bad insulation are prevented. Since the circuit board 66 has only one surface that serves as the mount surface (front surface), the thickness of the insulating film 96 can be uniform. For this reason, this brings efficiency to the insulating film formation process by hot melting. In addition to this, the position detecting pattern formation portion 66a is water-tightly sealed by two seal members 98a and 98b. Therefore, liquids are unlikely to seep into this portion.

The strength adjustment knob 43 is arranged in proximity to the clutch operation lever 38, for example, is mounted on the upper part of the second mechanism mount plate 37 to be pivotable in a range of about 270°, for example. The positioning mechanism 84 that positions the strength adjustment knob 43 at one of the eight positions is arranged between the second mechanism mount plate 37 and the strength adjustment knob 43. The aforementioned brush member 81 is mounted to the strength adjustment knob 43 to be movable together with the strength adjustment knob 43.

As discussed above, in this embodiment, the strength adjustment knob 43 is arranged in proximity to the clutch operation lever 38 on the handle mount side. Accordingly, a series of operation including braking force adjustment operation by the strength adjustment knob 43, clutch-off operation, and casting operation can be smoothly performed.

The water depth indicator 13 indicates the paying-out amount of the fishing line from the spool 12, and is used to check the water depth of tackle, the casting distance, and the like. The water depth indicator 13 includes a case member 85 that is made of a synthetic resin, a liquid crystal display that is arranged inside the case member 85, and a water depth indicator control portion (not shown) that controls the liquid crystal display, as shown in FIGS. 1, 2, 5 and 8.

A rectangular opening 85a is formed at the position opposed to the opening 6e of the case member 85. A lens member 88 made of transparent resin is attached to the opening 85a. The opening 85a is opposed to the opening 6e that is formed in the bulging portion 6a. The lens member 88 is arranged on the outside of the opening 85a. The lens member 88 is fastened on the outer peripheral part of the opening 85a by a suitable method such as ultrasonic welding in that a horn is brought in contact with the outer surface of the lens member 88. Since a conventional lens member is arranged inside the opening 85a and is fastened by welding, the conventional lens member has poor strength against an external pressure. On the other hand, in this embodiment, since the lens member 88 is arranged on the outside of the opening 85a is fastened by welding, the lens member 88 can have higher strength against an external pressure. The case member 85 is arranged inside the bulging portion 6a. The opening 6e that is formed to be inclined in the bulging portion 6a is arranged at the outside of the lens member 88. The welded part of the lens member 88 can be hidden by the opening 6e.

The water depth indicator control portion calculates the paying-out length of the fishing line based on the rotational amount of the spool 12 by using the signals from a rotation sensor 87, and controls the liquid crystal display. The rotation sensor 87 includes a pair of lead switches that detect a sensor detection portion 86 that has magnets that are mounted to the end of the spool shaft 20. The water depth indicator 13 accommodates a power supply such as a battery. Note that the rotational amount of the spool 12 may be calculated by using signals from the rotational speed sensor 41 that is arranged on the mount side of the handle 2.

When casting the tackle, the angler pivots the clutch operation lever 38 rearward to bring the clutch mechanism 21 into the clutch-off state. Also, the angler operates the sounding knob 16 and the locking knob 17 to bring the spool sounding mechanism 14 and the spool locking mechanism 15 into an operation disabling state. In the clutch-off state, the spool 12 can rotate freely, and the fishing line will unwind from the spool 12 at full speed when casting due to the weight of the tackle. When the spool 12 rotates due to casting, the magnets 61 rotate around the inner peripheral sides of the coils 62, and if the switch element 63 is on, an electric current will flow through the coils 62 and the spool 12 will be braked. During casting, the rotational speed of the spool 12 will gradually become faster, and will be gradually reduced if a peak is exceeded. Also, when the spool 12 rotates, the indication of the water depth indicator 13 varies to indicate the paying-out amount (length) of the tackle from the spool 12.

When the tackle has landed in the water, the angler pivots the clutch operation lever 38 frontward to bring the clutch mechanism 21 into the clutch-on state, and moves the sounding knob 16 in the direction close to the bulging portion 6a to bring the spool sounding mechanism 14 into the sound generation enabling state. The angler then puts the fishing rod on a rock or the like, and waits for a bite from a fish. If a fish bites a bait and strikes the tackle, the fishing line may be paid out. In this case, the spool 12 rotates in the line paying-out direction, and the spool sounding mechanism 14 in the sound generation enabling state generates sound. Accordingly, the angler can recognize that fish bites the bait.

Also, if the tackle is snagged by a rock or the like in the water, the angler moves the locking knob 17 to the locked position to bring the spool locking mechanism 15 into the locked state. In this state, the rotation of the spool 12 in the line paying-out direction is directly locked. In this state, the angler orientates the fishing rod in line with the fishing line, and applies tension to the fishing line. Then, the angler pulls the fishing rod rearward, and cuts the fishing line.

The brake control of the control portion 55 in casting is now schematically described.

The spool braking mechanism 25 operates in any one of the eight braking modes. The braking pattern is selected by the strength adjustment knob 43. Note that, in the braking pattern, braking force (duty ratio of the switch element 63) varies in accordance with the braking time from the casting start. The present inventors discovered that if a large braking force is applied when this tension is at or below a predetermined value, the attitude of the tackle will reverse and stabilize just before the peak rotational speed of the spool 12 and the tackle will fly.

The following control is carried out in order to brake the spool 12 just before its peak rotational speed and make the tackle fly with a stable attitude. That is, a strong braking force is applied to the spool 12 at a highest duty ratio Dn1 (where n is an integer from 1 to 8) for a short period of time at the beginning of casting to make the tackle reverse (first braking process). Subsequently, in a second period, a duty ratio Dn2 varies so that the spool 12 is braked with a braking force that gradually weakens to a constant amount (second braking process). In a final third period, a duty ratio Dn3 varies so that the spool 12 is braked with a braking force that gradually weakens until the number of rotations of the spool 12 falls below a predetermined value. The duty ratios Dn1 to Dn3 vary in the eight modes in accordance with setting by the strength adjustment knob 43. Note that, in this embodiment, the duty ratios are shifted in the eight modes. Thus, the control portion 55 performs the first to third braking processes in that the duty ratios that turn the switch element 630N vary in the three stages in accordance with braking time.

Here, if the spool 12 is braked with a strong braking force before the rotational speed of the spool 12 peaks, tension that was at or below the first predetermined value Fs will be rapidly increased, backlash will be prevented, and the tackle will fly in a stable manner. Because of this, backlash can be prevented, the attitude of the tackle can be stabilized, and the tackle can be cast out further.

In addition, because the spool is controlled in three braking processes with different duty ratios and braking times in accordance with the rotational speed of the spool at the beginning of casting, the spool will be braked with duty ratios and braking times that differ depending upon the rotational speed of the spool, even when the settings are the same. Because of this, it will be unnecessary to manually adjust the braking force even if casting is performed with different spool rotational speeds, and thus the burden on the fisherman can be reduced.

Also, since the end surfaces of the coils 62 are opposed to the side surface of the rotor 60, even in the case where the spool braking mechanism 25 is arranged outside the spool 12, the increase of the radial size of the spool 12 can be suppressed. Also, since the coils 62 with the entire length L shorter than the winding diameter D of the coil 62 are used, even in the case where the spool braking mechanism 25 is arranged outside the spool 12, the increase of the axial length of the spool 12 can be suppressed. Therefore, even in the case where the spool braking mechanism 25 is arranged outside the spool 12, the increase of the reel in size can be suppressed.

In addition to this, in the operation mechanisms such as the spool sounding mechanism 14 and the spool locking mechanism 15, since the sounding knob 16 and the locking knob 17 as operation members are arranged at the fishing rod mount side of the bulging portion 6a, the angler can easily forcefully operate the operation members by using the bulging portion 6a. Therefore, it is possible to easily perform the switching operation of the operation mechanisms.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

For instance, in the foregoing embodiment, the dual bearing reel has been described which does not include a level wind mechanism nor a clutch return mechanism that returns the clutch mechanism 21 from the OFF state to the ON state when the handle 2 is rotated in the line-winding direction. However, the present invention can be provided with a dual bearing reel that has a level wind mechanism and a clutch return mechanism.

In another example, the second boss portion 7c, in the foregoing embodiment, is provided with the flange portion 7e and the flange portion 7e is fastened to the cover unit 7a by screws, the configuration of the rotation support member is not limited to this. For example, a cylindrical portion that is not provided with a flange portion may be threadedly fastened, or the cylindrical portion may be elastically retained.

Still yet in another example, even though the handle shaft, in the foregoing embodiment, is supported only by the one-way clutch, a bearing can be arranged in addition to the one-way clutch to support the handle shaft.

As used herein, the following directional terms "axial, radial, forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. For example, these terms can be construed as including a deviation of at least .+−0.5% of the modified term if this deviation would not negate the meaning of the word it modifies.

The term "configured" as used herein to describe a component, section or part of a device includes hardware and/or software that is constructed and/or programmed to carry out the desired function.

What is claimed is:

1. A dual bearing reel handle shaft support structure that rotatably supports a handle shaft on a reel unit of a dual bearing reel comprising:
    a rotational support member detachably mounted to the reel unit;
    a roller type one-way clutch including
        an outer ring non-rotatably coupled to the support member,
        an inner ring coupled to and that integrally rotates with the handle shaft, and rolling elements arranged between the outer and inner rings, the one-way clutch supporting rotatable movement of the handle shaft in only one direction;
    a pair of annular seal members arranged on an outer peripheral surface of the one-way clutch to simultaneously seal the one-way clutch and an interior region of at least the rotational support member; and
    a reinforcing member abutting and being directly affixed to an outer peripheral surface of the seal members.

2. The dual bearing reel handle shaft support structure set forth in claim 1, wherein the axial length of the inner ring protrudes beyond the axial length of the outer ring in both directions, and wherein the seal members seal the clearance between an inner peripheral surface of the support member and the outer peripheral surface of the inner ring.

3. The dual bearing reel handle shaft support structure set forth in claim 2, wherein the inner ring is coupled to and integrally rotates with the handle shaft through a drag washer that is coupled to and integrally rotates with the handle shaft.

4. The dual bearing reel handle shaft support structure set forth in claim 1, wherein the support member includes a flange portion detachably mounted to the reel unit, and a cylindrical portion that extends outwardly from the flange portion in the axial direction, the one-way clutch supported on an inner peripheral surface of the cylindrical portion.

5. The dual bearing reel handle shaft support structure set forth in claim 2, wherein each seal member includes a seal portion with
    a cylindrical mount section mounted to the inner peripheral surface of the support member,
    a disk section that extends from the mount section toward the inner ring, and
    a tapered lip section formed around the end of the disk section and in contact with the inner ring, the lip section is inclined from the end of the disk section in a direction away from the one-way clutch.

6. The dual bearing reel handle shaft support structure set forth in claim 1, wherein the rotational support member is a cylindrical rotational support member.

7. The dual bearing reel handle shaft support structure set forth in claim 1, wherein the seal members are arranged to enclose the one-way clutch on both sides.

8. The dual bearing reel handle shaft support structure set forth in claim 1, wherein the outer ring is coupled to the inner peripheral surface of the support member, and the inner ring is coupled to the outer periphery of the handle shaft.

9. A dual bearing reel, comprising:
a reel unit,
a handle shaft;
a detachable support member rotatably mounted to the reel unit;
a roller type one-way clutch including
an outer ring,
an inner ring, and
rolling elements between the outer and inner rings; and
a pair of annular seal members disposed on the outer peripheral surface of the one-way clutch to simultaneously seal the one-way clutch and an interior region of at least the rotational support member; and
a reinforcing member abutting and being directly affixed to an outer peripheral surface of the seal members.

10. The dual bearing reel set forth in claim 9, wherein the inner ring has a greater axial length than the outer ring.

11. The dual bearing reel set forth in claim 9, wherein the inner ring includes an engagement portion on its axial end such that the inner ring is coupled to and integrally rotates with the handle shaft through a drag washer that is coupled to and integrally rotates with the handle shaft.

12. The dual bearing reel claim 9, wherein the support member includes a detachable flange portion and a cylindrical portion, the flange portion extends radially outward from the cylindrical portion, the one-way clutch is mounted on the cylindrical portion.

13. The dual bearing reel set forth in claim 9, wherein each seal member includes
a seal portion with
a first section mounted onto the support member,
a second section extending radially from the first section and contiguous with the outer ring, and
a third section smaller than and positioned at an angle relative to the first and second sections, the third section in contact with the inner ring.

14. The dual bearing reel set forth in claim 9, wherein the support member is a cylindrical rotational support member.

15. The dual bearing reel set forth in claim 9, wherein the outer ring is non-rotatably coupled to the support member, and the inner ring is coupled to and integrally rotates with the handle shaft.

* * * * *